(12) United States Patent
Franchetti et al.

(10) Patent No.: US 9,286,216 B2
(45) Date of Patent: Mar. 15, 2016

(54) 3DIC MEMORY CHIPS INCLUDING COMPUTATIONAL LOGIC-IN-MEMORY FOR PERFORMING ACCELERATED DATA PROCESSING

(71) Applicant: Carnegie Mellon University, Pittsburgh, PA (US)

(72) Inventors: Franz Franchetti, Pittsburgh, PA (US); Qiuling Zhu, San Jose, CA (US); Lawrence T. Pileggi, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 179 days.

(21) Appl. No.: 14/157,040

(22) Filed: Jan. 16, 2014

(65) Prior Publication Data

US 2015/0199266 A1 Jul. 16, 2015

(51) Int. Cl.
*G06F 12/00* (2006.01)
*G06F 12/08* (2006.01)
*G06F 15/76* (2006.01)

(52) U.S. Cl.
CPC ............... *G06F 12/08* (2013.01); *G06F 15/76* (2013.01)

(58) Field of Classification Search
CPC ............................ G06F 12/0207; G06F 12/08
See application file for complete search history.

(56) References Cited

PUBLICATIONS

Zhu, Qiuling et al., "A Logic-in-Memory Accelerated DRAM System for Graph Data Processing," CMU Paper, Copyright: 2012, 9 pages.
Zhu, Qiuling et al., "A 3D-Stacked Logic-in-Memory Accelerator for Application-Specific Data Intensive Computing," Carnegie Mellon University: Department of Electrical and Computer Engineering, Copyright: 2013, 13 pages.

*Primary Examiner* — John Lane
(74) *Attorney, Agent, or Firm* — Withrow & Terranova, P.L.L.C.

(57) ABSTRACT

This disclosure relates to a three-dimensional (3D) integrated circuit (3DIC) memory chip including computational logic-in-memory (LiM) for performing accelerated data processing. Related memory systems and methods are also disclosed. In one embodiment, the 3DIC memory chip includes at least one memory layer that provides a primary memory configured to store data. The 3DIC memory chip also includes a computational LiM layer. The computational LiM layer is a type of memory layer having application-specific computational logic integrated into local memory while externally appearing as regular memory. The computational LiM layer and the primary memory are interconnected through through-silica vias (TSVs). In this manner, the computational LiM layer may load data from the primary memory with the 3DIC memory chip without having to access an external bus coupling the 3DIC memory chip to a central processing unit (CPU) or other processors to computationally process the data and generate a computational result.

31 Claims, 13 Drawing Sheets

3DIC MEMORY CHIPS INCLUDING COMPUTATIONAL LOGIC-IN-MEMORY FOR PERFORMING ACCELERATED DATA PROCESSING

STATEMENT OF FEDERAL SUPPORT

This invention was made with government funds under Contract No. HR0011-07-3-0002 awarded by DARPA. The U.S. Government has rights in this in this invention.

FIELD OF THE DISCLOSURE

This disclosure relates generally to memory systems and methods of operating the same.

BACKGROUND

Computing systems include one or more central processing units (CPUs) and memory (e.g., dynamic random access memory (DRAM), static random access memory (SRAM), etc.) to perform computational processes. The CPU may include generalized computational units and/or specialized computational units in order to perform data operations on data from the memory. A bus is provided between the CPU and the memory to allow the CPU to retrieve data for performing computational processes from memory and store computational results back into the memory. A memory controller is typically included in the memory and communicatively coupled to the bus to receive data access requests from the CPU and to provide data responses on the bus to the CPU. Some CPUs may provide for the memory controller to be integrated into the same package or chip as the CPU. In either scenario, the bandwidth of the bus governs the overall bandwidth of data transfers between the CPU and memory.

For high-value algorithms on large sets of data, the overall performance of these CPU-based processing systems is determined in large part by their memory bandwidth and memory access capabilities. However, there are limitations and costs associated with the memory bandwidths and memory access capabilities of a given traditional processing system. For example, irregular memory access patterns and a low ratio of flops to memory access are typical limitations of CPU-based processing systems when implementing algorithms on large sets of sparse data. As a result, traditional processing systems can suffer from poor locality of reference and deteriorations in memory access performance. Furthermore, a traditional processing system spends most of its resources on moving data rather than on performing computations. This not only hampers the performance of the processing system, but also causes the processing system to consume large amounts of energy on ancillary memory administration. Given the low energy requirements of modern electronic devices, the inefficiencies of traditional processing systems present significant design problems.

SUMMARY

Embodiments described herein include three-dimensional (3D) integrated circuit (3DIC) memory chips that include computational logic-in-memory (LiM) for performing accelerated data processing. Related memory systems and methods are also disclosed. In one embodiment, the 3DIC memory chip includes at least one memory layer that provides a primary memory configured to store data. The 3DIC memory chip also includes a computational LiM layer. The computational LiM layer is a memory layer for which application-specific computational logic is provided. As an example, the computational LiM layer can be monolithically integrated with embedded memory at a very fine granularity, either directly within the embedded memory block array, or closely surrounding it. The computational LiM layer and the primary memory are interconnected through vertical interconnect access structures (VIAs) such as through-silica VIAS (TSVs). In this manner, the computational LiM layer may load data from the primary memory without having to access an external bus coupling the 3DIC memory chip to a central processing unit (CPU) or other processors to computationally process the data and generate a computational result. The computational result can be communicated over the VIAs and stored in the primary memory within the 3DIC memory chip. Accordingly, the 3DIC memory chip allows for data to be communicated between the primary memory and the computational LiM layer, and for a computational result to be calculated and stored back in the primary memory without having to access the external bus to achieve accelerated processing.

As a non-limiting example, the primary memory can be utilized to store large sets of data. In this non-limiting example, the computational LiM layer can computationally process the data from the primary memory so as to accomplish certain memory-bound functions of data-intensive problems. As such, the computational results may be stored in the local memory, may be stored back to the primary memory, and/or may be sent to a host processor for higher-level interpretation that is less memory bound. The 3DIC memory chip therefore removes the memory access bottleneck over external buses created in traditional processing systems by providing a transparent, highly efficient low-power accelerator. The 3DIC memory chip can thus implement data-intensive, high-value algorithms such as graph algorithms, sparse matrix algorithms, interpolations, and/or the like, which are used in many important business analytic, manufacturing, and defense applications.

In this regard, in one embodiment, a 3DIC memory chip is disclosed. The 3DIC memory chip includes at least one memory layer, a computational LiM layer, and a plurality of VIAs. The memory layer(s) provide a primary memory configured to store data, while the computational LiM layer includes at least one LiM block. Functional logic units and state of the art high-speed embedded (local) memory (e.g., static random access memory (SRAM)) is provided in the LiM block(s). The primary memory of the memory layer(s) is interconnected to the plurality of VIAs and the functional logic units of the LiM block(s) load one or more data subsets of the data from the primary memory over the VIAs into the local memory. In this manner, the data stored in the primary memory may be transferred to the computational LiM layer internally without requiring the use of a system bus.

With regard to the LiM block(s), the local memory is interconnected to the functional logic units to process the data from the primary memory that is accessed through the VIAs. Accordingly, the functional logic units are configured to access the data subsets loaded into the local memory and computationally process the data subsets accessed to generate a computational result. The functional logic units then store the computational result in the local memory.

In another embodiment, a data processing method is disclosed. To implement the data processing method, data is stored in primary memory provided by at least one memory layer. One or more data subsets of the data from the primary memory are loaded into a computational LiM layer over a plurality of VIAs. The data subsets are processed computationally within the computational LiM layer. A computational result is stored. As examples, the computational result can be stored within the computational LiM layer, directly sent to the primary memory to be stored, or directly sent to a host processor for higher-level interpretation to then be stored.

In still another embodiment, a method of constructing a 3DIC memory chip is disclosed. To construct the 3DIC memory chip, at least one memory layer is formed, wherein the memory layer(s) include a primary memory configured to store data. A plurality of VIAs are formed and interconnected with the primary memory in the memory layer(s). Additionally, a computational LiM layer is formed that includes at least one LiM block. The LiM blocks are provided with local memory and functional logic units, wherein the local memory is interconnected with the functional logic units to process the data from the primary memory that is accessed through the VIAs. The functional logic units are configured to load one or more data subsets of the data from the primary memory over the VIAs into the local memory, access the data subsets loaded into the local memory, computationally process the data subsets accessed from the local memory to generate a computational result, and store the computational result in the local memory.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
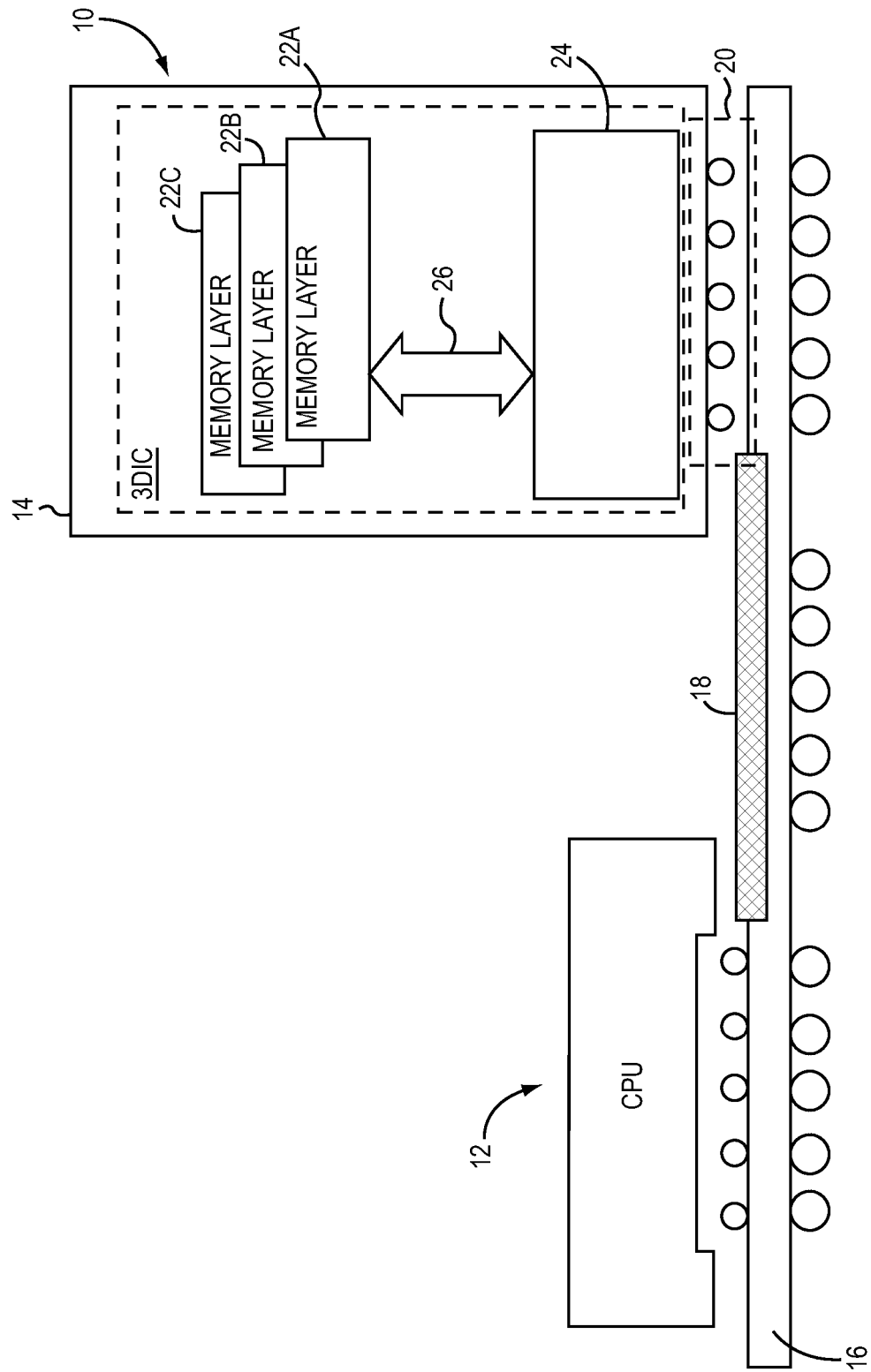
FIG. 1 illustrates a three-dimensional (3D) integrated circuit (3DIC) memory chip including computational logic-in-memory (LiM), and an exemplary central processing unit (CPU) operably associated with the 3DIC memory chip so that the 3DIC memory chip can be called on by the CPU to perform accelerated data processing.
Figure 2:
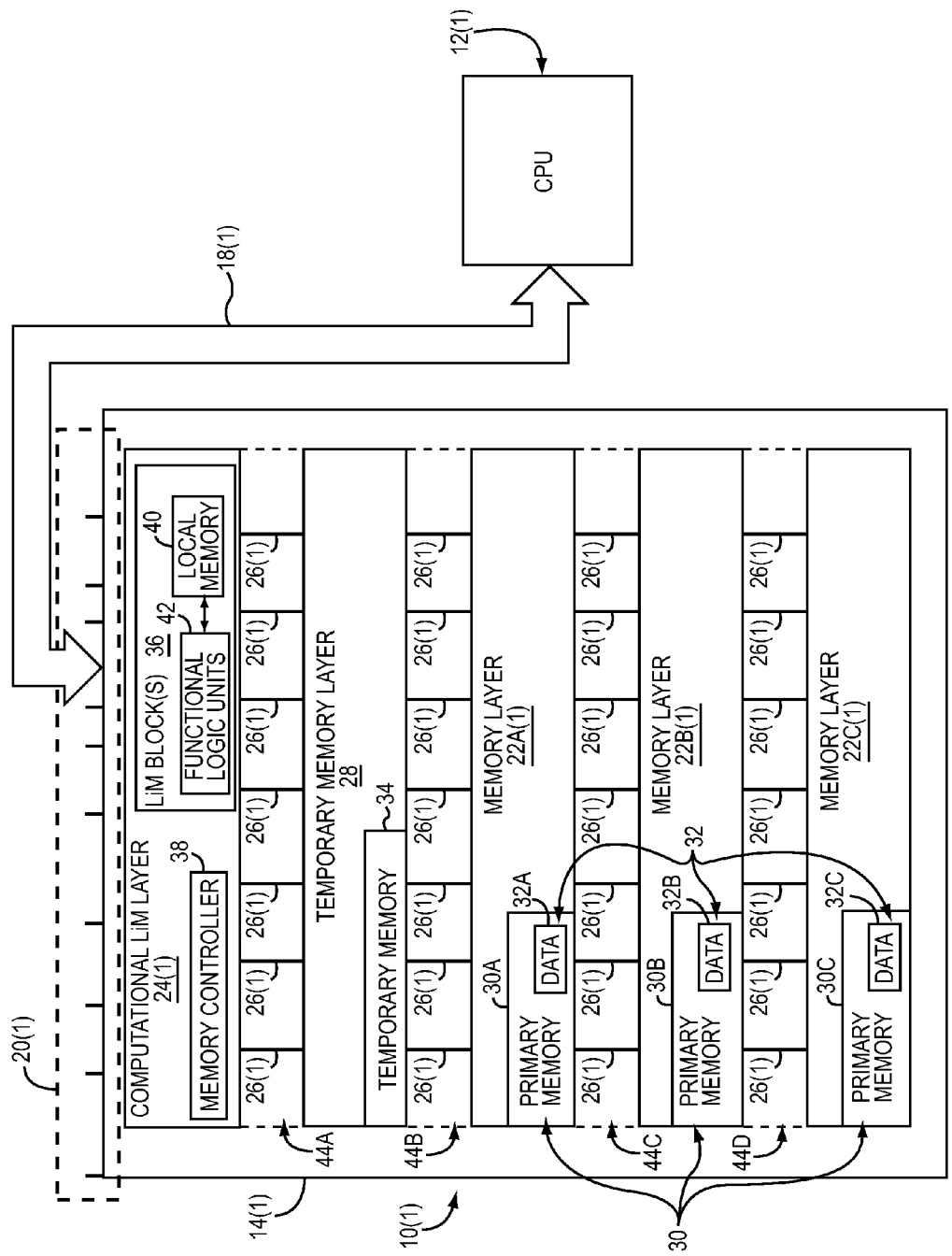
FIG. 2 illustrates an exemplary embodiment of the 3DIC memory chip and the CPU shown in FIG. 1, wherein the 3DIC memory chip includes exemplary memory layers having a primary memory, an exemplary temporary memory layer, and an exemplary computational LiM layer.
Figure 9A:
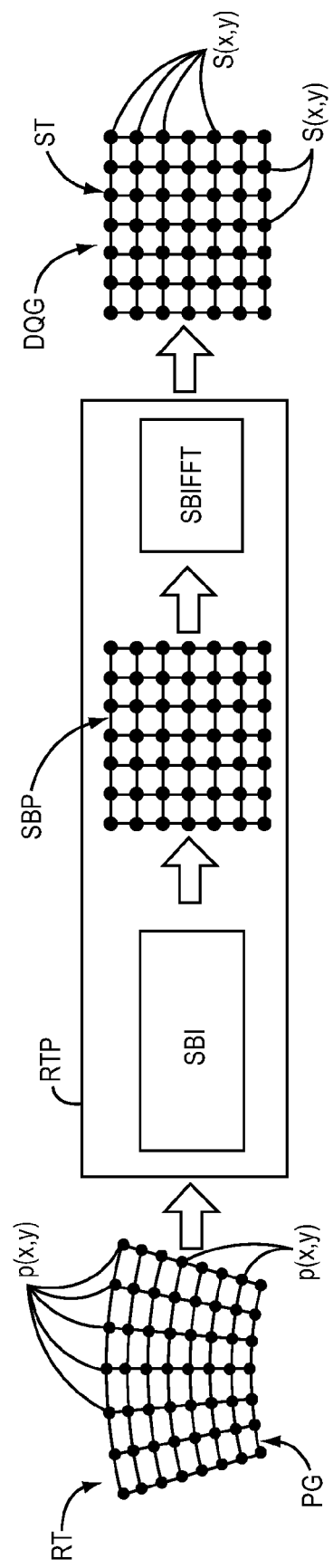
Figure 9B:
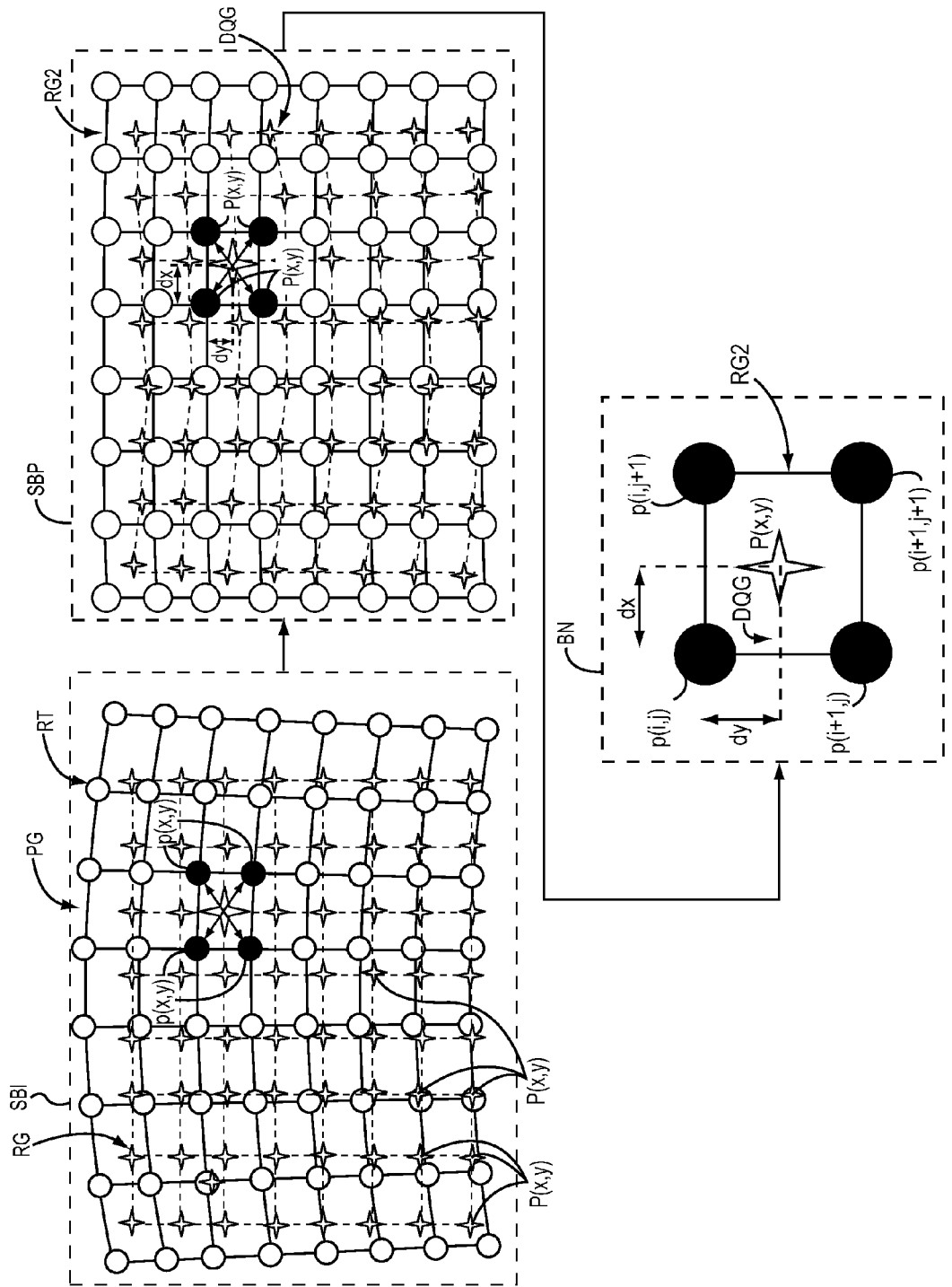
Figure 9C:
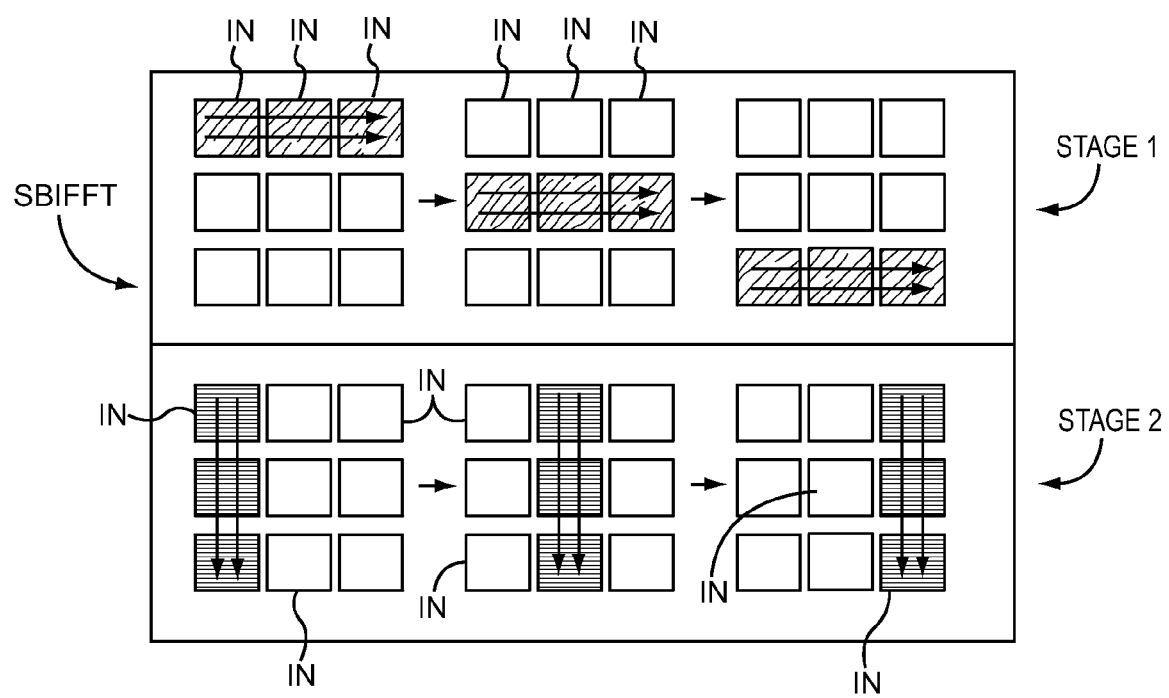
Figure 10:
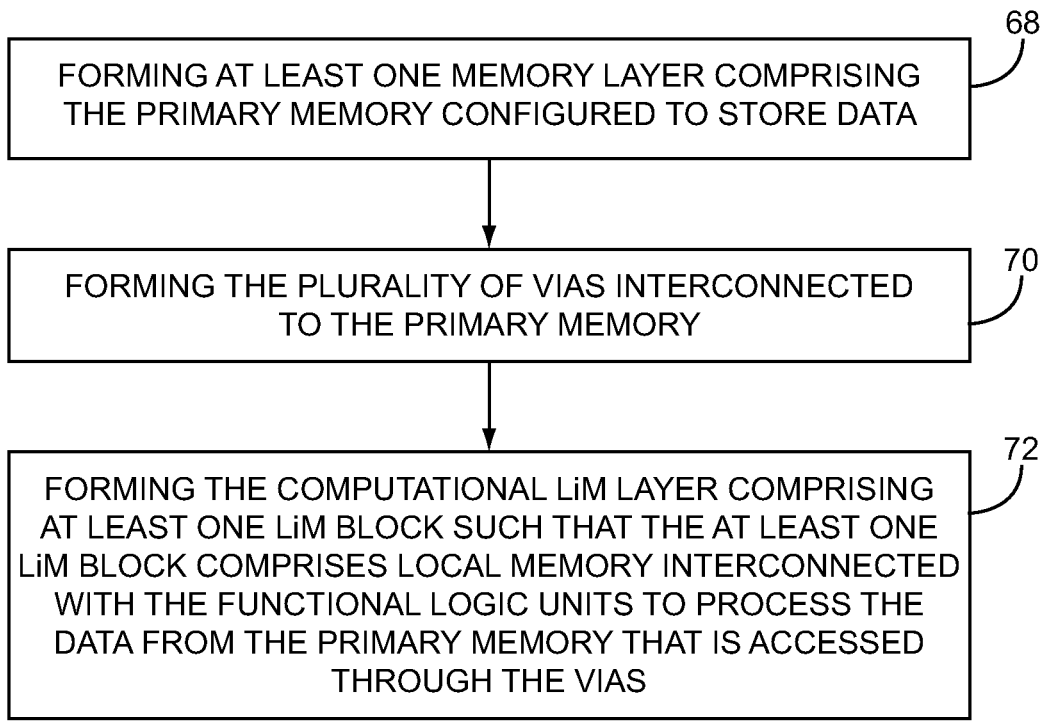

FIGS. 9A-9C are exemplary visual illustrations that demonstrate exemplary procedures that may be performed by the 3DIC memory chip shown in FIG. 2 when the computational LiM layer is configured to convert a radar reflectivity image tile with radar reflectivity image values in the Fourier domain and on a polar grid into a spatial radar image tile with spatial image values on a Cartesian coordinate (grid) and in the spatial domain; and FIG. 10 illustrates exemplary procedures that may be performed to construct the 3DIC memory chip shown in FIG. 1.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments described herein include three-dimensional (3D) integrated circuit (3DIC) memory chips that include computational logic-in-memory (LiM) for performing accelerated data processing. Related memory systems and methods are also disclosed. In one embodiment, the 3DIC memory chip includes at least one memory layer that provides a primary memory configured to store data. The 3DIC memory chip also includes a computational LiM layer. The computational LiM layer is a memory layer that integrates application-specific computational logic into memory. The computational LiM layer and the primary memory are interconnected through vertical interconnect access structures (VIAs) such as through-silica vias (TSVs). In this manner, the computational LiM layer may load data from the primary memory without having to access an external bus coupling the 3DIC memory chip to a central processing unit (CPU) or other processors to computationally process the data and generate a computational result. The computational result can be communicated over the VIAs and stored in the primary memory within the 3DIC memory chip. Accordingly, the 3DIC memory chip allows for data to be communicated between the primary memory and the computational LiM layer, and for a computational result to be calculated and stored back in the primary memory without having to access the external bus to achieve accelerated processing. Providing the computational LiM layer in the 3DIC memory chip allows the 3DIC memory chip to be integrated into a memory package with a standard memory pin configuration so that computations may be performed by the 3DIC memory chip without having to go over the external bus.

As a non-limiting example, the primary memory in the memory layer(s) can be utilized to store large sets of data. The computational LiM layer can efficiently computationally process the data from the primary memory. The 3DIC memory chip therefore removes the memory access bottleneck over external buses created in traditional processing systems by providing a transparent, highly efficient low-power accelerator. The 3DIC memory chip can thus implement data-intensive, high-value algorithms such as graph algorithms, sparse matrix algorithms, interpolations, and/or the like, which are used in many important business analytic, manufacturing, and defense applications.

In this regard, FIG. 1 illustrates a 3DIC memory chip 10 and a central processing unit (CPU) 12. In this embodiment, the 3DIC memory chip 10 is integrated into a memory package 14. The memory package 14 and the CPU 12 may be mounted on a printed circuit board 16 and communicatively associated through a system bus 18 provided by the printed circuit board 16. For example, the printed circuit board 16 may be a motherboard, and the CPU 12 and the 3DIC memory chip 10 in the memory package 14 may be provided within a computer system.

In an alternative embodiment, the 3DIC memory chip 10 is not provided in the memory package 14, but rather the CPU 12 may be provided within the same electronic package and be integrated as part of the same integrated circuit (IC). For example, the 3DIC memory chip 10 and the CPU 12 may form a two-and-a-half dimensional (2.5D) IC (2.5DIC) provided within a 2.5D electronic package. The 2.5D electronic package includes a silicon interposer, and the 3DIC memory chip 10 and the CPU 12 are mounted on the silicon interposer. The silicon interposer includes VIAs (such as TSVs) that interconnect the 3DIC memory chip 10 with the CPU 12 to form the 2.5DIC. In this case, the 3DIC memory chip 10 and the CPU 12 may communicate using advanced signals.

Referring again to the 3DIC memory chip 10 shown in FIG. 1, data and control information is transferred between the 3DIC memory chip 10 and the CPU 12 through the system bus 18. The 3DIC memory chip 10 thus includes a memory interface 20 that is configured to couple the 3DIC memory chip 10 so that exogenous circuitry, such as the CPU 12, can communicate with the 3DIC memory chip 10 within the memory package 14. The memory interface 20 may also include interface management components so that external communications to and from the 3DIC memory chip 10 can be coordinated appropriately.

The 3DIC memory chip 10 includes one or more memory layers referred to generally as element 22. Any number of the memory layers 22 may be provided in the 3DIC memory chip 10. In the example of the 3DIC memory chip 10 in FIG. 1, the memory layers are comprised of three (3) memory layers 22A, 22B, 22C. The 3DIC memory chip 10 also includes a computational LiM layer 24 and a plurality of VIAs 26. More specifically, the computational LiM layer 24 and the memory layers 22A, 22B, 22C are stacked within the memory package 14 and interconnected by the VIAs 26 so as to form a 3DIC for the 3DIC memory chip 10. The memory layers 22A, 22B, 22C are configured to store data and may each be two-dimensional (2D) chips stacked over one another and interconnected by the VIAs 26. The memory layers 22 may include high-density memory to store large amounts of data before or after a computation.

The computational LiM layer 24 is also provided in the stack and is interconnected with the memory layers 22 by the VIAs 26. However, the computational LiM layer 24 in this embodiment is a type of memory layer that integrates application-specific computational logic into memory. The memory of the computational LiM layer 24 may be of higher speed and lower density than the memory in the memory layers 22. In this manner, data subsets stored in the memory layers 22 may be loaded into the computational LiM layer 24 and computationally processed by application-specific computational logic. Accordingly, the computational processing performed by the application-specific computational logic on the data subsets may be any type of algorithm that produces computational results (i.e., processed data) exogenously meaningful to a user and/or external computational process. For example, application-specific computational logic may perform high-value algorithms such as graph algorithms, sparse matrix algorithms, interpolations, and/or the like, which are used in many important business analytic, manufacturing, and defense applications. Thus, the computational processing performed by the application-specific computational logic is not administrative data manipulation that is only endogenously meaningful to the administration of the 3DIC memory chip 10, such as memory control operations. Note that this does not imply that the computational LiM layer 24 does not or cannot perform endogenous administrative operations. Rather, to clarify, it simply means that the computational LiM layer 24 is also configured to perform computational processing to produce exogenously meaningful computational results.

The computational results generated by the computational LiM layer 24 and the data subsets used to generate the computational results may be stored by the computational LiM layer 24. More specifically, the memory on the computational LiM layer 24 provides buffering for data subsets loaded from the memory layers 22 and for computational results generated with the application-specific computational logic in the computational LiM layer 24. The computational results may then either be loaded into the memory layers 22 over the VIAs 26 or may be output exogenously as data to the system bus 18 through the memory interface 20. Accordingly, the 3DIC memory chip 10 alleviates the computational load of the CPU 12, since the computational LiM layer 24 provides computational processing for specific algorithms. Furthermore, note that the computational LiM layer 24 can use the data stored on the memory layers 22, since data subsets from the memory layers 22 can be passed over the VIAs 26. The memory layers 22 are internal, and thus are located within the memory package 14. Accordingly, the computational LiM layer 24 does not have to access the system bus 18, since the computational processing is endogenous to the computational LiM layer 24 and thus also to the memory package 14. Therefore, unlike the CPU 12, the computational LiM layer 24 is not limited by the bandwidth of the system bus 18. Rather, the VIAs 26 that interconnect the computational LiM layer 24 and the memory layers 22 provide an endogenous communication channel between the computational LiM layer 24 and the memory layers 22.

Furthermore, the VIAs 26 may be sized and provided at a density within the memory package 14 so that the bandwidth of the VIAs 26 is matched to the processing speed of the computational LiM layer 24. The CPU 12 may thus route data for storage by the 3DIC memory chip 10 from the CPU 12 or from other circuitry (not shown) on the printed circuit board 16 or the silicon interposer. Since the application-specific computational logic provided by the computational LiM layer 24 is tailored to perform a specific algorithm, the CPU 12 or some other type of external circuitry (not shown) may then instruct the 3DIC memory chip 10 to perform the application-specific algorithm. Data subsets of the data stored in the memory layers 22 may then be loaded in the memory of the computational LiM layer 24, which provides memory buffering. The computational LiM layer 24 thus generates computational results using the application-specific computational logic, which may either be stored back in the memory layers 22 or returned to the requestor, such as the CPU 12. In this manner, the performance of data-intensive algorithms which present significant computing inefficiencies to the CPU 12 (as a result of the limited bandwidth of the system bus 18) is passed to the 3DIC memory chip 10. Once the computational results are generated by the computational LiM layer 24, the computational results can be passed over the system bus 18 to the CPU 12 so that the CPU 12 can use the computational results to perform other tasks.

To accommodate standard computing systems, the memory interface 20 may be configured such that the 3DIC memory chip 10 appears externally to the CPU 12 as a non-computational memory chip. Accordingly, the 3DIC memory chip 10 may be configured to receive an arbitrary address in a virtual address space, but return a computational result computed by the computational LiM layer 24. For instance, the memory interface 20 may comply with standard dual in-line memory module (DIMM) memory interface form factors for dynamic random access memory (DRAM). In this case, the 3DIC memory chip 10 can be provided as a drop-in replacement for a standard DRAM memory chip.

Note that while the 3DIC memory chip 10 shown in FIG. 1 includes only the single computational LiM layer 24, other embodiments may have any number of computational LiM layers like the computational LiM layer 24. For example, multiple computational LiM layers identical to the computational LiM layer 24 shown in FIG. 1 may be provided to perform parallel computational processing. On the other hand, multiple computational LiM layers 24 may be provided where the application-specific computational logic of the different computational LiM layers 24 is configured to perform different algorithms. Thus, when a particular algorithm is to be implemented, the computational LiM layers 24 that are tailored to that particular algorithm are activated, while the remaining computational LiM layers 24 are deactivated.

FIG. 2 illustrates an exemplary 3DIC memory chip 10(1) and a CPU 12(1). The 3DIC memory chip 10(1) and the CPU 12(1) are embodiments of the 3DIC memory chip 10 and the CPU 12 shown in FIG. 1. More specifically, the 3DIC memory chip 10(1) is integrated into a memory package 14(1) (which is an embodiment of the memory package 14 shown in FIG. 1) and is communicatively associated with the CPU 12(1) through a system bus 18(1) (which is one embodiment of the system bus 18 shown in FIG. 1) that is connected to a memory interface 20(1) (which is one embodiment of the memory interface 20 shown in FIG. 1) provided by the memory package 14(1). The 3DIC memory chip 10(1) includes memory layers (referred to generically as elements 22(1) and specifically as elements 22A(1), 22B(1), 22C(1)) that are embodiments of the memory layers 22 shown in FIG. 1. More specifically, the 3DIC memory chip 10(1) has a memory layer 22A(1) (which is one embodiment of the memory layer 22A shown in FIG. 1), a memory layer 22B(1) (which is one embodiment of the memory layer 22B shown in FIG. 1), and a memory layer 22C(1) (which is one embodiment of the memory layer 22C shown in FIG. 1). The 3DIC memory chip 10(1) also includes a computational LiM layer 24(1) (which is one embodiment of the computational LiM layer 24 shown in FIG. 1). The computational LiM layer 24(1) is interconnected with the memory layers 22(1) by TSVs 26(1) (which are one embodiment of the VIAs 26 shown in FIG. 1). In this embodiment, the 3DIC memory chip 10(1) also includes a temporary memory layer 28 that is interconnected with the computational LiM layer 24(1) and the memory layers 22(1) through the TSVs 26(1).

The memory layers 22(1) include a primary memory (referred to collectively as element 30 and specifically as primary memory subsections 30A, 30B, 30C) configured to store data (referred to collectively as element 32 and specifically as data 32A, 32B, 32C). The TSVs 26(1) are interconnected with the primary memory 30. More specifically, the memory layer 22A(1) has a primary memory subsection 30A of the primary memory 30. The primary memory subsection 30A in the memory layer 22A(1) is configured to store the data 32A. The primary memory subsection 30A is interconnected with the TSVs 26(1). The memory layer 22B(1) has a primary memory subsection 30B of the primary memory 30. The primary memory subsection 30B in the memory layer 22B(1) is configured to store the data 32B. The primary memory subsection 30B is also interconnected with the TSVs 26(1). Furthermore, the memory layer 22C(1) has a primary memory subsection 30C of the primary memory 30. The primary memory subsection 30C in the memory layer 22C(1) is configured to store the data 32C. The primary memory subsection 30C is also interconnected with the TSVs 26(1). Additionally, the temporary memory layer 28 includes temporary memory 34 that is also interconnected with the TSVs 26(1).

The computational LiM layer 24(1) shown in FIG. 2 includes one or more LiM blocks 36 and a memory controller 38. The memory controller 38 may be configured to manage and coordinate data transfers between the memory layers 22(1), the temporary memory layer 28, and the computational LiM layer 24(1). The LiM blocks 36 provided by the computational LiM layer 24(1) allow the computational LiM layer 24(1) to perform computationally intensive algorithms. More specifically, the LiM blocks 36 include local memory 40 and functional logic units 42 in this example.

In this embodiment, the functional logic units 42 are monolithically integrated with the local memory 40. As such, the functional logic units 42 may be embedded within the local memory 40 either directly or at a very fine granularity. The functional logic units 42 may also be monolithically integrated with the local memory 40 such that they closely surround the local memory 40. The local memory 40 is interconnected with the functional logic units 42 to process the data 32 from the primary memory 30 that is accessed through the TSVs 26(1). The local memory 40 may thus serve as a memory buffer within the LiM blocks 36. The local memory 40 may also be interconnected with the TSVs 26(1) to transfer data subsets and computational results into and from the computational LiM layer 24(1).

With respect to the functional logic units 42, the functional logic units 42 can load blocks of the data 32 from the primary memory 30 to the local memory 40 for computational processing. More specifically, the functional logic units 42 are configured to load one or more data subsets of the data 32 from the primary memory 30 over the TSVs 26(1) into the local memory 40. Since the TSVs 26(1) may be dense and short, the data subsets of the data 32 from the memory layers 22(1) can be loaded relatively quickly, especially in comparison to the memory bandwidth and pincount associated with data transfers on the system bus 18(1). The functional logic units 42 are configured to access the data subsets loaded into the local memory 40.

The functional logic units 42 are also configured to computationally process the data subsets accessed from the local memory 40 to generate a computational result. The functional logic units 42 are further configured to store the computational result in the local memory 40. The memory controller 38 may then load the computational result into the primary memory 30 in the memory layers 22(1) through the TSVs 26(1), and/or may output the computational result from the local memory 40 through the memory interface 20(1) for transfer along the system bus 18(1) to the CPU 12(1). The 3DIC memory chip 10(1) can optimize data transfers from the primary memory 30 to the computational LiM layer 24(1) in accordance with the computational processing speed of the functional logic units 42. The local memory 40 is high-speed memory that allows for the data subsets to be loaded quickly from the memory layers 22(1) using the TSVs 26(1) for computational processing by the functional logic units 42. In order to increase performance, the primary memory 30 should have a higher memory density than the local memory 40. Additionally, the local memory 40 may have faster data access speeds than the primary memory 30. As such, the data 32 stored in the primary memory 30 may be significantly greater in amount than the data subsets of the data 32 stored in the local memory 40. In this manner, the local memory can be used to hold a (smaller) data subset for a data-intensive algorithm. However, since the local memory 40 may have faster data access speeds than the primary memory 30, the (smaller) data subsets of the data 32 can be accessed from the primary memory 30 and stored in the local memory 40 so that the data subsets of the data 32 from the primary memory 30 are transferred in equilibrium with the faster data transfer speeds of the local memory 40. The TSVs 26(1) thus allow for high bandwidth data movement between the primary memory 30 and the local memory 40.

In this embodiment, the 3DIC memory chip 10(1) also includes the temporary memory layer 28, which is interconnected by the TSVs 26(1) between the memory layers 22(1) and the computational LiM layer 24(1). The memory controller 38 may be configured to activate and deactivate the temporary memory layer 28. When the temporary memory layer 28 is deactivated by the memory controller 38, the data subsets of the data 32 are loaded from the primary memory 30 directly to the local memory 40 in the computational LiM layer 24(1) through the TSVs 26(1). However, to load the data subsets of the data 32 from the primary memory 30 when the temporary memory layer 28 is active, the functional logic units 42 are configured to load the data subsets of the data 32 from the primary memory 30 into the temporary memory 34 through the TSVs 26(1). Once the data subsets are loaded into the temporary memory 34, the functional logic units 42 are configured to load the data subsets of the data 32 from the temporary memory 34 into the local memory 40 through the TSVs 26(1). The temporary memory 34 of the temporary memory layer 28 can thus be utilized to store data subsets that are or are likely to be used more than once by the functional logic units 42 during computational processing. The temporary memory layer 28 thus helps avoid inefficient reloadings of the same data subset. The memory controller 38 is configured to coordinate data transfers from the primary memory 30 of the memory layers 22(1), the temporary memory 34 of the temporary memory layer 28, and the local memory 40 in the LiM blocks 36 of the computational LiM layer 24(1).

In this embodiment, the memory controller 38 is operable in a memory-only mode and a computational mode. In this manner, the CPU 12(1) can either utilize the 3DIC memory chip 10(1) to computationally process the data subsets from the primary memory 30, as described above, or may deactivate the computational LiM layer 24(1) and the temporary memory layer 28 so that the 3DIC memory chip 10(1) operates as a memory-only chip. For instance, while the memory controller 38 is in the memory-only mode, the memory controller 38 is configured to allow the CPU 12(1) to access the primary memory 30 in the memory layers 22(1) in the same manner that the CPU 12(1) accesses a memory-only chip. Consequently, in the memory-only mode, the LiM blocks 36 are deactivated and the 3DIC memory chip 10(1) operates like a memory-only chip. Thus, the CPU 12(1) utilizes the 3DIC memory chip 10(1) like a non-computational memory chip.

With regard to the computational mode, the memory controller 38 is configured to activate the LiM blocks 36. As such, while the memory controller 38 is in the computational mode, the functional logic units 42 are configured to load one or more data subsets of the data 32 from the primary memory 30 over the TSVs 26(1) into the local memory 40. As explained above, the functional logic units 42 can then access one or more of the data subsets loaded into the local memory 40 and computationally process the data subsets accessed from the local memory 40 to generate a computational result. The computational result is stored in the local memory 40. The computational result may then be transferred by the memory controller 38 into the primary memory 30, or may be output through the memory interface 20(1) over the system bus 18(1) to the CPU 12(1). Alternatively, the computational result may be transferred directly to the primary memory 30 or may be transferred directly to the CPU 12(1) for higher-level interpretation.

Software being implemented by the CPU 12(1) may generate an arbitrary address identifying data subsets to be computationally processed by the 3DIC memory chip 10(1). The memory controller 38 may receive the arbitrary address from the CPU 12(1) and locate the data subsets in a virtual address space. In response, the functional logic units 42 may be configured to load the data subsets of the data 32 in the primary memory 30 that are identified by the arbitrary address. The functional logic units 42 may access the data subsets loaded into the local memory 40 and computationally process the data subsets to generate a computational result. The computational result may then be stored in the local memory 40. Consequently, the CPU 12(1) simply has to access the primary memory 30 in the memory layers 22(1) using the arbitrary address in order to indicate to the memory controller 38 the appropriate data subsets of the data 32 to be computationally processed. In this manner, the memory controller 38 is configured to return the computational result that is generated by the functional logic units 42 to the CPU 12(1) when the CPU 12(1) accesses the primary memory 30 in the memory layers 22(1) while the memory controller 38 is in the computational mode.

As shown in FIG. 2, the memory layers 22(1), the temporary memory layer 28, and the computational LiM layer 24(1) are stacked to form a 3DIC within the memory package 14(1). The TSVs 26(1) interconnect the memory layers 22(1), the temporary memory layer 28, and the computational LiM layer 24(1). More specifically, the TSVs 26(1) extend through back end of lines (BEOLs) (referred to generically as elements 44 and specifically as elements 44A-44D). More specifically, the TSVs 26(1) extend through a BEOL 44A to interconnect the computational LiM layer 24(1) to the temporary memory layer 28. The TSVs 26(1) extend through a BEOL 44B to interconnect the temporary memory layer 28 to the memory layer 22A(1). The TSVs 26(1) extend through a BEOL 44C to interconnect the memory layer 22A(1) to the memory layer 22B(1). Finally, the TSVs 26(1) extend through a BEOL 44D to interconnect the memory layer 22B(1) to the memory layer 22C(1). Accordingly, the TSVs 26(1) allow for vertical communications between the computational LiM layer 24(1), the temporary memory layer 28, the memory layer 22A(1), the memory layer 22B(1), and the memory layer 22C(1). The computational LiM layer 24(1), the temporary memory layer 28, the memory layer 22A(1), the memory layer 22B(1), and the memory layer 22C(1) may thus each be two-dimensional (2D) chips. The TSVs 26(1) are configured to allow for large data transfers so that the functional logic units 42 have an abundant data supply in order to eliminate or substantially reduce a memory wall between the computational speed of the functional logic units 42 and data transfer speeds. By reducing or eliminating the memory wall, the data transfer efficiency of the 3DIC memory chip 10(1) is increased, thereby also increasing the power efficiency of the 3DIC memory chip 10(1).

Figure 3:
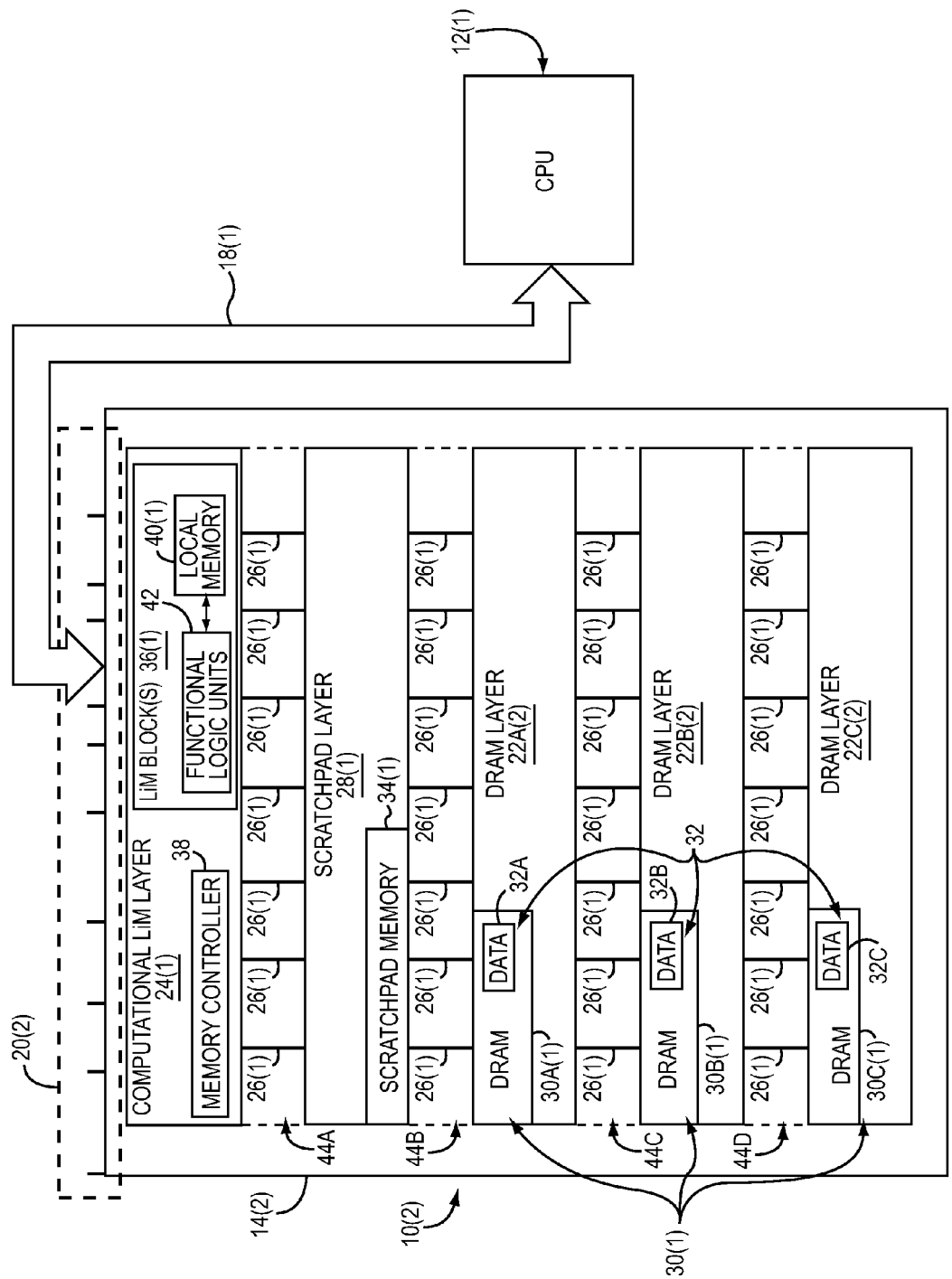
FIG. 3 illustrates an exemplary implementation of the 3DIC memory chip and the CPU shown in FIG. 2, wherein the exemplary memory layers are provided as dynamic random access memory (DRAM) layers and the exemplary temporary memory layer is provided as a scratchpad layer.

FIG. 3 illustrates another 3DIC memory chip 10(2), which is another embodiment of the 3DIC memory chip 10(1) shown in FIG. 2. The 3DIC memory chip 10(2) is operably associated with the CPU 12(1) and operates in the same manner described above with regard to the 3DIC memory chip 10(1) in FIG. 2. The 3DIC memory chip 10(2) is integrated within a memory package 14(2), which is one embodiment of the memory package 14(1) shown in FIG. 2. However, in this embodiment, the memory package 14(2) is a DRAM memory package. To communicate with the CPU 12(1), the system bus 18(1) is coupled to a memory interface 20(2), which is one embodiment of the memory interface 20(1) shown in FIG. 2.

In this embodiment, the memory interface 20(2) is a standard DRAM memory interface. More specifically, the memory interface 20(2) complies with standard DIMM memory interface form factors for DRAM. In this manner, the CPU 12(1) can access the 3DIC memory chip 10(2) like a standard DRAM memory chip. The 3DIC memory chip 10(2) can thus be connected to establish communication with the system bus 18(1) like a standard DRAM memory chip. For example, the memory interface 20(2) includes pins that may be configured to be inserted as one of a plurality of DRAM chips on a DIMM memory board. The DIMM memory board may include a bus interface with electrical contacts. The DIMM memory board may be coupled to the system bus 18(1) by inserting the bus interface within a DIMM slot on a motherboard (not shown). The system bus 18(1) may be coupled to the DIMM slot and the motherboard so that the plurality of memory chips (including the 3DIC memory chip 10(2)) can communicate with the CPU 12(1) through the system bus 18(1).

The 3DIC memory chip 10(2) includes DRAM layers (referred to generically as elements 22(2) and specifically as elements 22A(2), 22B(2), and 22C(2)), which are embodiments of the memory layers 22(1) shown in FIG. 2. More specifically, a DRAM layer 22A(2) is one embodiment of the memory layer 22A(1) shown in FIG. 2. Also, a DRAM layer 22B(2) is one embodiment of the memory layer 22B(1) shown in FIG. 2. Finally, a DRAM layer 22C(2) is one embodiment of the memory layer 22C(1) shown in FIG. 2.

The 3DIC memory chip 10(2) includes the computational LiM layer 24(1), which is interconnected with the DRAM layers 22(2) through the TSVs 26(1) in the same manner described above with respect to the 3DIC memory chip 10(1) shown in FIG. 2. As such, a scratchpad layer 28(1) is stacked between the DRAM layers 22A(2) and the computational LiM layer 24(1) and interconnected with the TSVs 26(1). Since the memory package 14(2) is a DRAM memory package, the DRAM layers 22(2) include DRAM (referred to generically as element 30(1) and specifically to DRAM within the memory layers 22A(2), 22B(2), and 22C(2) as elements 30A(1), 30B(1), and 30C(1), respectively), which is one embodiment of the primary memory 30 shown in FIG. 2. The DRAM 30(1) is thus configured to store the data 32. More specifically, the DRAM 30(1) includes DRAM 30A(1) (which is one embodiment of the primary memory subsection 30A shown in FIG. 2) that is configured to store the data 32A. Also, the DRAM layer 22B(2) includes DRAM 30B(1) (which is one embodiment of the primary memory subsection 30B shown in FIG. 2) that is configured to store the data 32B. The DRAM layer 22C(2) includes DRAM 30C(1) (which is one embodiment of the primary memory subsection 30C shown in FIG. 2) that is configured to store the data 32C.

The computational LiM layer 24(1) shown in FIG. 3 includes LiM block(s) 36(1), which are one embodiment of the LiM blocks 36 described above with respect to FIG. 2. The LiM block(s) 36(1) include the functional logic units 42 described above. Furthermore, the LiM block(s) 36(1) include static random access memory (SRAM) 40(1), which is one embodiment of the local memory 40 described above with respect to FIG. 2. Thus, in this embodiment, the functional logic units 42 are monolithically integrated with the SRAM 40(1). The LiM blocks 36(1) are configured to load one or more data subsets of the data 32 from the DRAM 30(1) over the TSVs 26(1) into the SRAM 40(1). The functional logic units 42 are thus also configured to access the data subsets loaded into the SRAM 40(1), computationally process the data subsets accessed from the SRAM 40(1) to generate a computational result, and store the computational result in the SRAM 40(1), as described above with regard to the 3DIC memory chip 10(1) shown in FIG. 2. The functional logic units 42 thus include the application-specific computational logic, which is configured to generate the computational result from the data subsets loaded into the SRAM 40(1) from the DRAM layers 22(2).

In this embodiment, the scratchpad layer 28(1) includes scratchpad memory 34(1), which is one embodiment of the temporary memory 34 described above with regard to FIG. 2. Thus, when the memory controller 38 activates the Q layer 28(1), the functional logic units 42 are configured to load the data subsets of the data 32 from the DRAM 30(1) into the scratchpad memory 34(1) through the TSVs 26(1). Once the data subsets are loaded into the scratchpad memory 34(1), the functional logic units 42 load the data subsets from the scratchpad memory 34(1) into the SRAM 40(1) through the TSVs 26(1). In this embodiment, the TSVs 26(1) are sized for DRAM streaming. Accordingly, memory requests to the DRAM layers 22(2) can be streamed, thereby resulting in streams of data subsets being transferred over the TSVs 26(1) from the DRAM 30(1) to the scratchpad memory 34(1) and/or the SRAM 40(1). The data bandwidth provided by the DRAM 30(1) may be balanced with the data processing throughput of the functional logic units 42, and the TSVs 26(1) may thus be sized to optimize the DRAM streaming from the DRAM layers 22(2). Thus, ideally, the memory wall problem is eliminated by the 3DIC memory chip 10(2), since the internal memory transfer speed of the 3DIC memory chip 10(2) matches the computational processing speed of the functional logic units 42.

Figure 4:
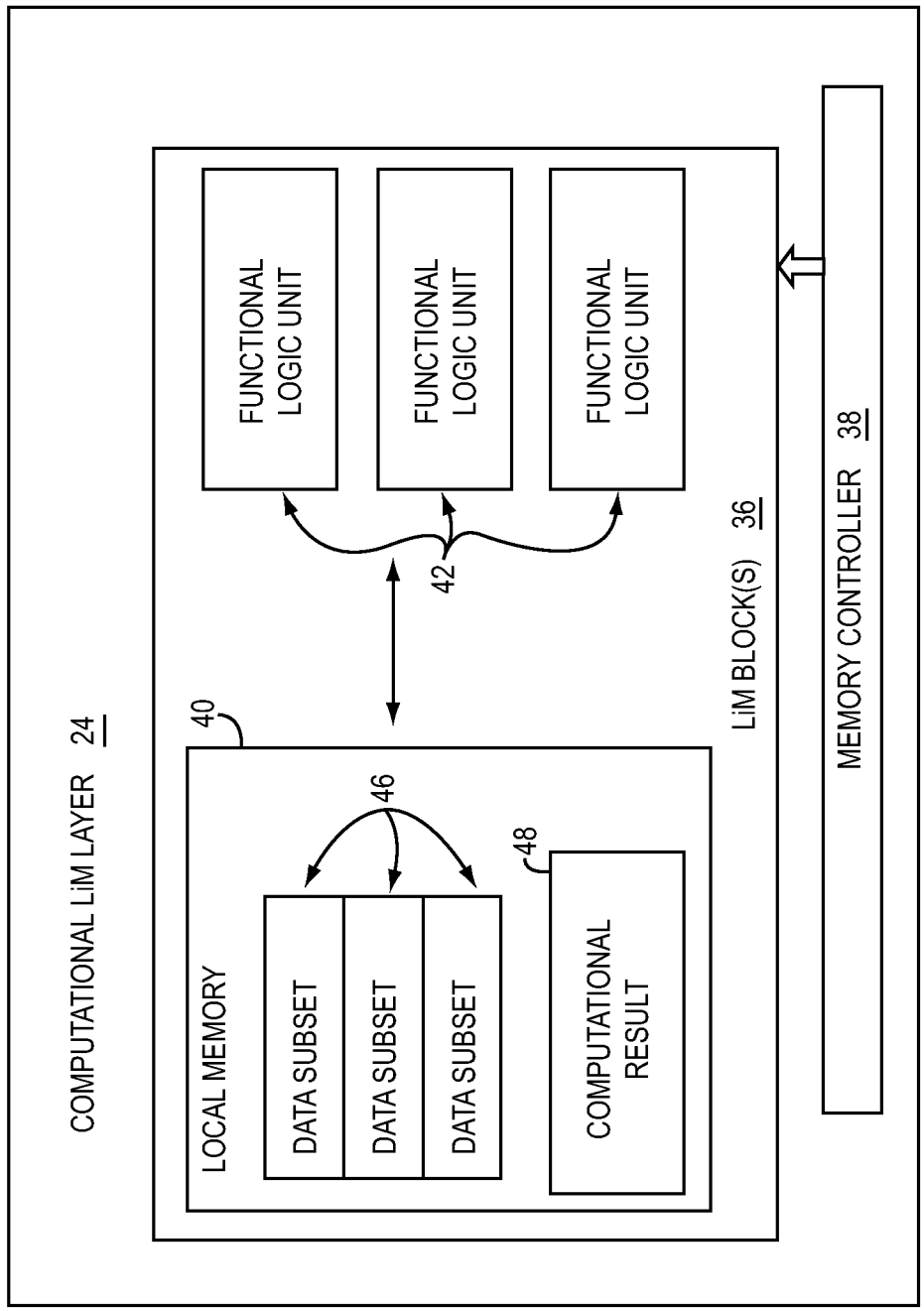
FIG. 4 illustrates one embodiment of a computational LiM layer.

FIG. 4 illustrates one embodiment of the computational LiM layer 24 shown in the 3DIC memory chip 10(1) of FIG. 2 and the 3DIC memory chip 10(2) shown in FIG. 3. The computational LiM layer 24 includes the functional logic units 42 and the local memory 40 (e.g., the SRAM 40(1) shown in FIG. 3). In this embodiment, the functional logic units 42 are embedded in the local memory 40. The functional logic units 42 are configured to load data subsets 46 from the primary memory 30 (shown in FIG. 2) over the TSVs 26(1) (shown in FIG. 2) and into the local memory 40. The functional logic units 42 then access the data subsets 46 loaded into the local memory 40 and computationally process the data subsets 46 from the local memory 40 to generate a computational result 48. As shown in FIG. 4, the functional logic units 42 store the computational result 48 in the local memory 40. Communications between the functional logic units 42, the local memory 40, and the primary memory 30 (shown in FIG. 2) are controlled by the memory controller 38. Furthermore, when the memory controller 38 has activated the temporary memory layer 28 (shown in FIG. 2), the memory controller 38 may also coordinate communications between the temporary memory 34 (shown in FIG. 2), the functional logic units 42, and the local memory 40.

Figure 5:
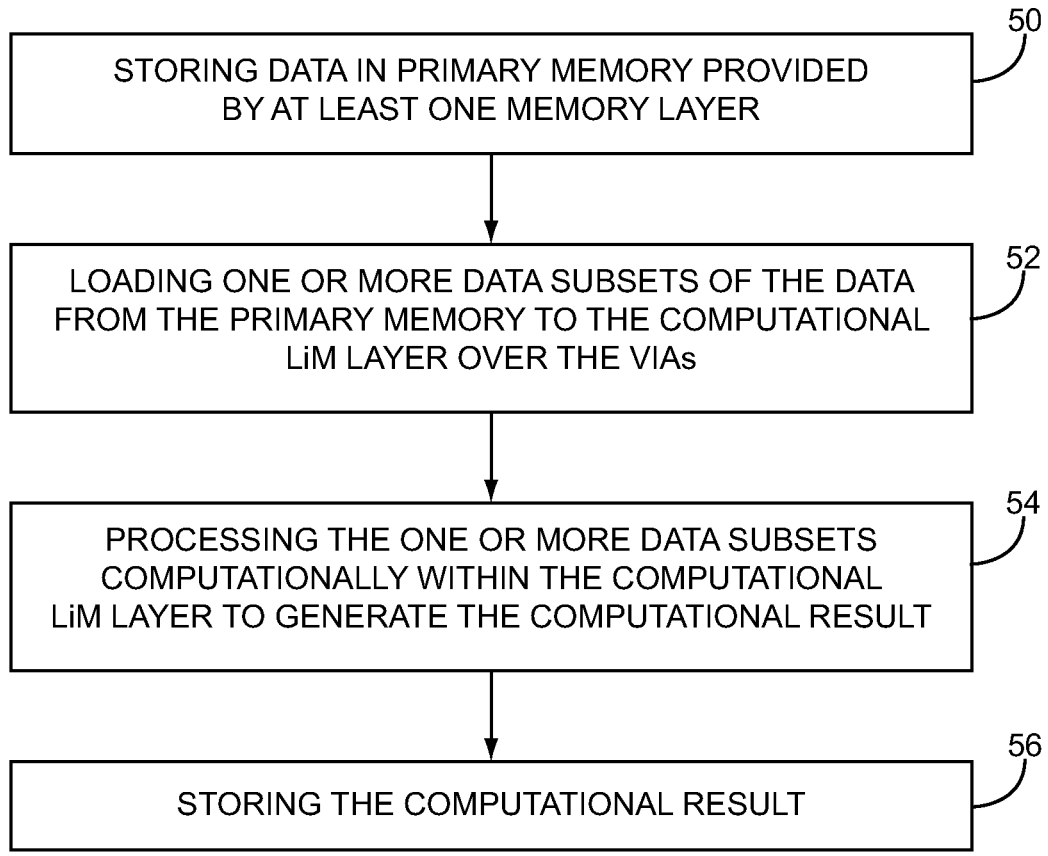
FIG. 5 illustrates exemplary procedures of a data processing method that may be performed by the 3DIC memory chip shown in FIG. 1 to generate a computational result using the computational LiM layer based on data from the primary memory.

Referring now to FIGS. 1 and 5, FIG. 5 illustrates exemplary processes that may be implemented by the 3DIC memory chip 10 in order to perform a data processing method. The procedures in FIG. 5 may be performed endogenously within the 3DIC memory chip 10 and may be triggered exogenously by the CPU 12. For example, the CPU 12 may communicate a memory request to the 3DIC memory chip 10 over the system bus 18. In this manner, the 3DIC memory chip 10 may be triggered to perform the procedures shown in FIG. 5 and return a computational result (e.g., the computational result 48 shown in FIG. 4) to the CPU 12 over the system bus 18.

Initially, the 3DIC memory chip 10 may store data in the primary memory (e.g., the primary memory 30 shown in FIG. 2) provided by at least one memory layer 22 (block 50). Different types of data may be stored in the primary memory of the memory layers 22. For example, sparse matrices, images, multi-dimensional data arrays, and/or any other type of information that may be computationally processed by the computational LiM layer 24 may be stored in the memory layers 22. In response to an address, a memory request, or a processing request from the CPU 12, the 3DIC memory chip 10 may load one or more data subsets of the data 32 from the primary memory to the computational LiM layer 24 over the VIAs 26 (block 52). As such, these data subsets can be loaded into the computational LiM layer 24 so that application-specific computational logic integrated with the local memory 40 (e.g., the SRAM 40(1) shown in FIG. 3) in the computational LiM layer 24 can process the data subsets. Once the data subsets are loaded into memory within the computational LiM layer 24, the 3DIC memory chip 10 processes the one or more data subsets computationally within the computational LiM layer 24 to generate the computational result (block 54).

Of course, the type of computational result will depend on the types of data stored by the memory layers 22 and the type of application-specific computational logic provided by the computational LiM layer 24. For example, if large sparse matrices are stored within the memory layers 22, the computational result may include outputs resulting from operations on the sparse matrices or computations resulting from sub-matrices within the sparse matrices. In another example, radar images may be stored by the memory layers 22. The application-specific computational logic within the LiM layer 24 may thus include Synthetic Aperture Radar (SAR) image reconstruction logic that converts the radar reflectivity images or portions of the radar reflectivity images with radar reflectivity image value in the Fourier domain into spatial radar images or portions of spatial radar images with spatial image value in the spatial domain. The 3DIC memory chip 10 stores the computational result (block 56). For example, the 3DIC memory chip 10 may store the computational result within the computational LiM layer 24. The computational result may then be stored within the memory layers 22 and/or transmitted exogenously through the system bus 18 to the CPU 12. Alternatively, the 3DIC memory chip 10 may directly transmit the computational result to the memory layer 22 or the CPU 12.

Figure 6:
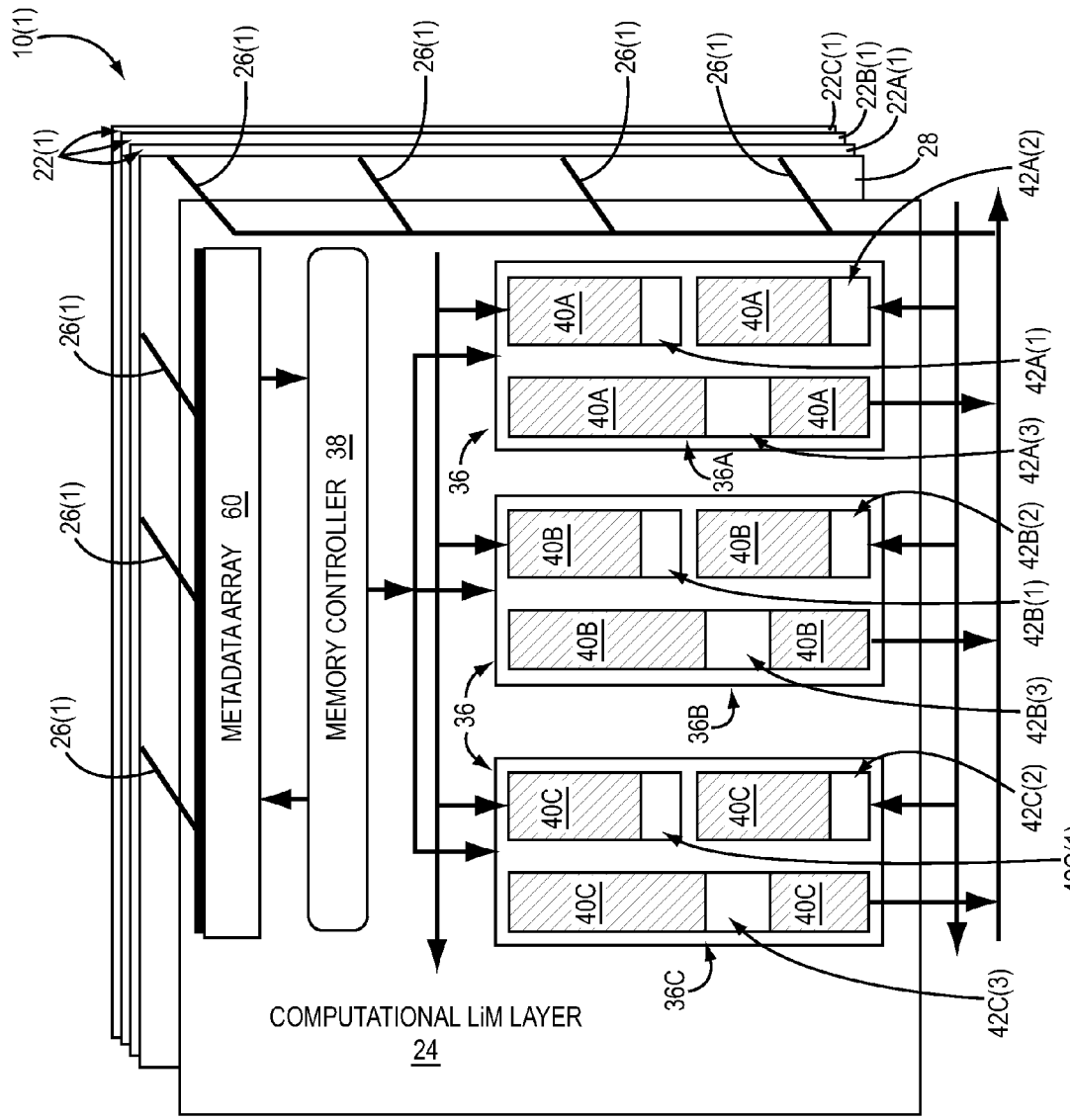
FIG. 6 illustrates an exemplary embodiment of a computational LiM layer with a functional unit with functional logic units to process data from the primary memory.

FIG. 6 illustrates one embodiment of the computational LiM layer 24 of the 3DIC memory chip 10(1) shown in FIG. 2. The computational LiM layer 24 includes the LiM blocks 36, the memory controller 38, and a metadata array 60. More specifically, the computational LiM layer 24 includes a LiM block 36A, a LiM block 36B, and a LiM block 36C. The LiM block 36A includes a functional logic unit 42A(1), a functional logic unit 42A(2), and a functional logic unit 42A(3). The LiM block 36B includes a functional logic unit 42B(1), a functional logic unit 42B(2), and a functional logic unit 42B(3). Finally, the LiM block 36C includes a functional logic unit 42C(1), a functional logic unit 42C(2), and a functional logic unit 42C(3). Furthermore, the LiM block 36A includes a first local memory section 40A, the LiM block 36B includes a second local memory section 40B, and the LiM block 36C includes a third local memory section 40C.

In this embodiment, the functional logic units 42A(1), 42A(2), 42A(3) are monolithically integrated and embedded into the first local memory section 40A. The functional logic units 42B(1), 42B(2), and 42B(3) are monolithically integrated and embedded into the second local memory section 40B. Finally, the functional logic units 42C(1), 42C(2), and 42C(3) are monolithically integrated and embedded into the third local memory section 40C. Each of the LiM blocks 36A, 36B, and 36C may be identical. In this manner, data subsets may be processed in parallel by each of the LiM blocks 36 so that the computational result is generated with greater computational throughput. In one embodiment, the functional logic units 42A(1), 42B(1), and 42C(1) in each of the LiM blocks 36A, 36B, and 36C are each configured to load and access a data subset. The data subset is stored the functional logic units 42A(1), 42B(1), and 42C(1) in the first local memory section 40A, the second local memory section 40B, and the third local memory section 40C, respectively. Similarly, the functional logic units 42A(2), 42B(2), and 42C(2) are each configured to load and access another data subset into the first local memory section 40A, the second local memory section 40B, and the third local memory section 40C, respectively. Finally, each of the functional logic units 42A(3), 42B(3), and 42C(3) is configured to assemble the computational result in the first local memory section 40A, the second local memory section 40B, and the third local memory section 40C, respectively. Consequently, each of the LiM blocks 36A, 36B, and 36C computationally processes different data subsets. The memory controller 38 manages the computations of the LiM blocks 36 such that conflicts are avoided. The metadata array 60 stores information that maps the data subsets to the primary memory 30 (shown in FIG. 2) and the temporary memory 34 (shown in FIG. 2) of the memory layers 22(1) and the temporary memory layer 28.

As such, the 3DIC memory chips 10, 10(1), and 10(2) shown in FIGS. 1-3 can be used for specialized computational processing that involves continuous access to data stored in the memory layers (e.g., the memory layers 22, 22(1), 22(2) in FIGS. 1-3). Memory walls can make these types of specialized computational processing inefficient and slow. Thus, rather than providing this data over a system bus (e.g., the system buses 18, 18(1) in FIGS. 1-3) to a CPU (e.g., the CPUs 12, 12(1) in FIGS. 1-3) or other specialized hardware, one or more computational LiM layers (e.g., the computational LiM layers 24 in FIGS. 1-4) can be employed to perform these specialized processes endogenously within the 3DIC memory chips 10, 10(1), and 10(2) to reduce bus latency, etc. The local memory 40 (shown in FIGS. 2 and 4) is part of the computational LiM layers (e.g., the computational LiM layers 24 in FIGS. 1-4) and is used to buffer the data subsets from the memory layers (e.g., the memory layers 22, 22(1), 22(2) in FIGS. 1-3) to perform computational processing and to generate a computational result. Also, as will be discussed in more detail below, the functional logic units 42 (shown in FIG. 4) and the local memory 40 (shown in FIG. 4) of the computational LiM layers (e.g., the computational LiM layers 24 in FIGS. 1-4) can be organized in a manner that provides for efficient retrieval of the data from the memory layers (e.g., the memory layers 22, 22(1), 22(2) in FIGS. 1-3) in order to perform the specialized computational operations. In this regard, one example of specialized computational processing may be sparse matrix multiplication.

Referring now to FIGS. 2, 6, and 7A-7C, FIGS. 7A-7C are exemplary visual illustrations that demonstrate exemplary procedures that may be performed by the 3DIC memory chip 10(1) shown in FIG. 2 with the computational LiM layer 24 shown in FIG. 6 when the temporary memory layer 28 is deactivated by the memory controller 38. Thus, it is presumed that the LiM blocks 36A, 36B, and 36C shown in FIG. 6 are each configured to perform operations in order to computationally process the sparse matrices stored as the data 32 in the primary memory 30.

Figure 7A:
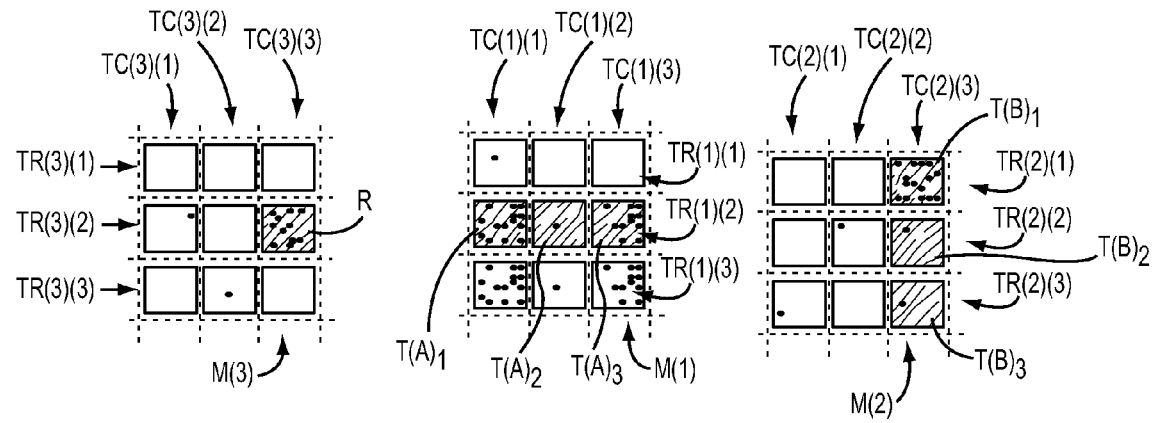
FIGS. 7A-7C are exemplary visual illustrations that demonstrate exemplary procedures that may be performed by the 3DIC memory chip shown in FIG. 2 to provide sparse matrix-matrix multiplication with the computational LiM layer shown in FIG. 6 when the temporary memory layer is deactivated.

Referring now specifically to FIGS. 2, 6, and 7A, FIG. 7A is an exemplary visual illustration of a sparse matrix M(1), a sparse matrix M(2), and a sparse matrix M(3) stored as the data 32 within the primary memory 30 of the memory layers 22(1). Non-zero entries within each of the sparse matrices M(1), M(2), and M(3) are indicated by black dots. The non-zero entries may be any value that is not equal to zero. For example, the non-zero entries may be integers, real numbers, complex numbers, rational numbers, and/or irrational numbers that are not equal to zero. With regard to the sparse matrices M(1), M(2), and M(3) shown in FIGS. 7A-7C, the sparse matrix M(1) and the sparse matrix M(2) are the sparse matrices to be, or that have been, multiplied, while the sparse matrix M(3) is the matrix that results from the multiplication of the sparse matrix M(1) and the sparse matrix M(2). The memory layers 22(1) are configured to store each of the matrices M(1), M(2), and M(3) within the primary memory 30 such that each of the matrices M(1), M(2), and M(3) is stored as a plurality of submatrix tiles that are provided within each of the matrices M(1), M(2), M(3).

In this embodiment, each of the matrices M(1), M(2), and M(3) is a rectangular (and in particular, square) matrix and the plurality of submatrix tiles in each of the sparse matrices M(1), M(2), and M(3) are 2D rectangular hypersparse tiles (e.g., 2D square hypersparse tiles). Thus, as shown in FIG. 7A, the sparse matrix M(1) is stored as a 3×3 matrix of 2D hypersparse tiles, wherein the sparse matrix M(1) includes a submatrix tile column TC(1)(1), a submatrix tile column TC(1)(2), and submatrix tile column TC(1)(3), and a submatrix tile row TR(1)(1), a submatrix tile row TR(1)(2), and a submatrix tile row TR(1)(3) of the submatrix tiles. (Collectively, the submatrix tile columns TC(1)(1), TC(1)(2), TC(1)(3) are generically referred to as TC(1), and the submatrix tile rows TR(1)(1), TR(1)(2), TR(1)(3) are generically referred to as TR(1).)

The sparse matrix M(2) is stored as a 3×3 matrix of 2D hypersparse tiles, wherein the sparse matrix M(2) includes a submatrix tile column TC(2)(1), a submatrix tile column TC(2)(2), and a submatrix tile column TC(2)(3), and a submatrix tile row TR(2)(1), a submatrix tile row TR(2)(2), and a submatrix tile row TR(2)(3) of submatrix tiles. (Collectively, the submatrix tile columns TC(2)(1), TC(2)(2), TC(2)(3) are generically referred to as TC(2), and the submatrix tile rows TR(2)(1), TR(2)(2), TR(2)(3) are generically referred to as TR(2).) The sparse matrix M(3) is stored as a 3×3 matrix of 2D hypersparse tiles, wherein the sparse matrix M(3) includes a submatrix tile column TC(3)(1), a submatrix tile column TC(3)(2), and a submatrix tile column TC(3)(3), and a submatrix tile row TR(3)(1), a submatrix tile row TR(3)(2), and a submatrix tile row TR(3)(3) of submatrix tiles. (Collectively, the submatrix tile columns TC(3)(1), TC(3)(2), TC(3) (3) are generically referred to as TC(3), and the submatrix tile rows TR(3)(1), TR(3)(2), TR(3)(3) are generically referred to as TR(3).)

For the purposes of explanation, the non-zero elements within each of the submatrix tiles are illustrated as if spaced by zero elements. This may or may not be the case. For example, the memory layers 22(1) are configured to store each of the plurality of submatrix tiles of each of the sparse matrices M(1), M(2), M(3) in a compressed sparse matrix format within the primary memory 30. Consequently, the non-zero elements of each submatrix tile are stored in consecutive memory locations. In one embodiment, the submatrix tiles for each of the sparse matrices M(1), M(2), and M(3) are stored in a Compressed Sparse Row (CSR) format. Accordingly, three different arrays are stored for each of the submatrix tiles in each of the sparse matrices M(1), M(2), and M(3). The first array stores the non-zero element values of the submatrix tile. The second array stores the subcolumn indices of each of the non-zero elements within the submatrix tile. The third array stores the memory location of the first non-zero element within a subrow of the submatrix tile. In another exemplary embodiment, each of the submatrix tiles of each of the sparse matrices M(1), M(2), M(3) is stored by the memory layers 22(1) in the primary memory 30 in a Compressed Sparse Column (CSC) format. For each submatrix tile of the submatrix tiles in each of the sparse matrices M(1), M(2), M(3), the submatrix tile is stored in three arrays. In the CSC format, the first array is of the non-zero element values of the submatrix tile. The second array is of the subrow indices of the non-zero elements. The third array stores the array location of the first non-zero matrix element that starts a subcolumn (e.g., the column pointer of the first non-matrix value in the subcolumn of the submatrix tile). In this manner, only the non-zero elements of the sparse matrices M(1), M(2), and M(3) are stored within the primary memory 30 of the memory layers 22(1). The metadata array 60 shown in FIG. 6 maps the submatrix tiles and each of the sparse matrices M(1), M(2), and M(3) to memory locations within the primary memory 30. In this manner, the submatrix tiles for each of the sparse matrices M(1), M(2), and M(3) are partitioned and can be located for processing or as output from the 3DIC memory chip 10(1). It should be noted that any other type of compressed sparse matrix format may be used to store each of the submatrix tiles of each of the sparse matrices M(1), M(2), M(3) in the primary memory 30 of the memory layers 22(1). For example, the submatrix tiles of the sparse matrices M(1), M(2), M(3) may be stored in the primary memory 30 in a Doubly Compressed Sparse Column (DCSC) format, a coordinate (COO) format, and/or the like.

To multiply the sparse matrix M(1) and the sparse matrix M(2) in order to generate the corresponding submatrix tiles of the submatrix tile rows TR(3) of the sparse matrix M(3), each of the submatrix tiles in the submatrix tile rows TR(1) of the sparse matrix M(1) is multiplied by the submatrix tiles in the submatrix tile columns TC(2). For example, to generate the submatrix tile R within the submatrix tile row TR(3)(2) and the submatrix tile column TC(3)(3) of the sparse matrix M(3), the submatrix tiles $T(A)_1$, $T(A)_2$, $T(A)_3$ within the submatrix row TR(1)(2) of the sparse matrix M(1) are multiplied by the submatrix tiles $T(B)_1$, $T(B)_2$, $T(B)_3$ within the submatrix tile column TC(2)(3) of the sparse matrix M(2).

More specifically, the functional logic units 42 are configured to load the submatrix tile $T(A)_1$ and the submatrix tile $T(B)_1$ as data subsets from the primary memory 30 over the TSVs 26(1) and into the local memory 40. The functional logic units 42 then access the submatrix tile $T(A)_1$ and the submatrix tile $T(B)_1$ loaded into the local memory 40. To computationally process the submatrix tile $T(A)_1$ and the submatrix tile $T(B)_1$ accessed from the local memory 40, the functional logic units 42 include application-specific computational logic operable to perform a sparse matrix-matrix multiplication algorithm. More specifically, the functional logic units 42 are configured to perform a sparse matrix-matrix multiplication algorithm that multiplies the submatrix tile $T(A)_1$ and the submatrix tile $T(B)_1$ to generate a resulting submatrix tile. The functional logic units 42 are then configured to accumulate the resulting submatrix tile within the submatrix tile R of the sparse matrix $M(3)$. The functional logic units 42 are then configured to load the submatrix tile $T(A)_2$ and the submatrix tile $T(B)_2$ from the primary memory 30 over the TSVs 26(1) into the local memory 40.

The functional logic units 42 access the submatrix tile $T(A)_2$ and the submatrix tile $T(B)_2$ loaded into the local memory 40. To computationally process the submatrix tile $T(A)_2$ and the submatrix tile $T(B)_2$ accessed from the local memory 40, the functional logic units 42 are configured to perform the sparse matrix-matrix multiplication algorithm that multiplies the submatrix tile $T(A)_2$ and the submatrix tile $T(B)_2$ so as to generate another resulting submatrix tile. The functional logic units 42 then accumulate this other resulting submatrix tile within the submatrix tile R of the sparse matrix $M(3)$.

Finally, the functional logic units 42 are configured to load the submatrix tile $T(A)_3$ from the primary memory 30 over the TSVs 26(1) into the local memory 40. The functional logic units 42 then access the submatrix tile $T(A)_3$ and the submatrix tile $T(B)_3$ loaded into the local memory 40. To computationally process the submatrix tile $T(A)_3$ and the submatrix tile $T(B)_3$ accessed from the local memory 40, the functional logic units 42 are configured to perform the sparse matrix-matrix multiplication algorithm that multiplies the submatrix tile $T(A)_3$ and the submatrix tile $T(B)_3$ so as to generate another resulting submatrix tile. Once the three resulting submatrix tiles are accumultated in the submatrix tile R, the submatrix tile R is loaded from the local memory 40 into the primary memory 30. The other submatrix tiles within the sparse matrix $M(3)$ are calculated in an analogous manner.

Figure 7B:
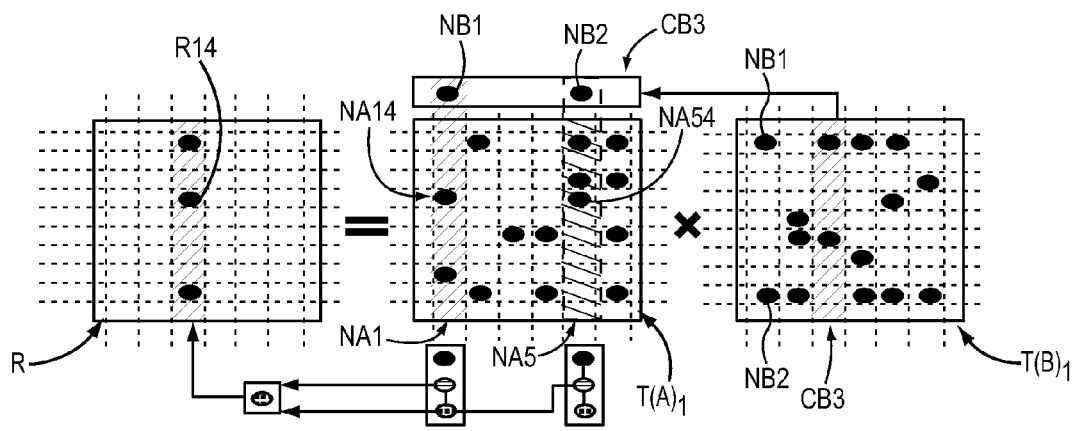

Referring now to FIGS. 2 and 7B, FIG. 7B illustrates one embodiment of procedures that may be utilized to multiply the submatrix tile $T(A)_1$ and the submatrix tile $T(B)_1$ to generate the resulting submatrix tile. In order to multiply the submatrix tile $T(A)_1$ and the submatrix tile $T(B)_1$ (or any of the other submatrix tiles of the sparse matrix $M(1)$ and the sparse matrix $M(2)$), the submatrix tile $T(A)_1$ and the submatrix tile $T(B)_1$ are assumed to be formatted in accordance with the CSC format, and the functional logic units 42 are configured to perform the sparse matrix-matrix multiplication algorithm as a generalized sparse matrix-matrix multiplication (SpGEMM) algorithm.

FIG. 7B illustrates how the non-zero elements in the third column of the resultant submatrix tile R are calculated. To do this, a third subcolumn CB3 of the submatrix tile $T(B)_1$ is flipped to become a subrow, and then intersections between each subrow of the submatrix tile $T(A)_1$ and the (flipped) third subcolumn CB3 of the submatrix tile $T(B)_1$ are determined. If there is an intersection, the non-zero elements are multiplied and stored in order to calculate the corresponding non-zero elements of the submatrix tile R. Thus, for example, a first non-zero element NB1 of the submatrix tile $T(B)_1$ in the first subrow of the (flipped) third subcolumn CB3 intersects the first non-zero entry NA14 in the first subcolumn NA1 and fourth subrow of the submatrix tile $T(A)_1$. These two values are multiplied and accumulated at the non-zero element R14 (which is initially zero (0)) in the fourth subrow of the third column of the submatrix tile R. If there are no other intersections with the fourth subrow of the submatrix tile $T(A)_1$, this becomes the non-zero entry R14 of the submatrix tile R after the submatrix tile $T(A)_1$ is multiplied with the submatrix tile $T(B)_1$. All the other non-zero entries in the submatrix tile R are calculated in an analogous manner.

Since this same SpGEMM algorithm is also used to multiply the submatrix tile $T(A)_2$ with the submatrix tile $T(B)_2$ to generate the submatrix tile R, and to multiply the submatrix tile $T(A)_3$ and the submatrix tile $T(B)_3$ to generate the submatrix tile R, the resultant submatrices of these operations are accumulated in the submatrix tile R in order to generate the computational result (i.e., the submatrix tile R). The computational results for the other submatrix tiles in the sparse matrix $M(3)$ are calculated in an analogous manner.

Figure 7C:
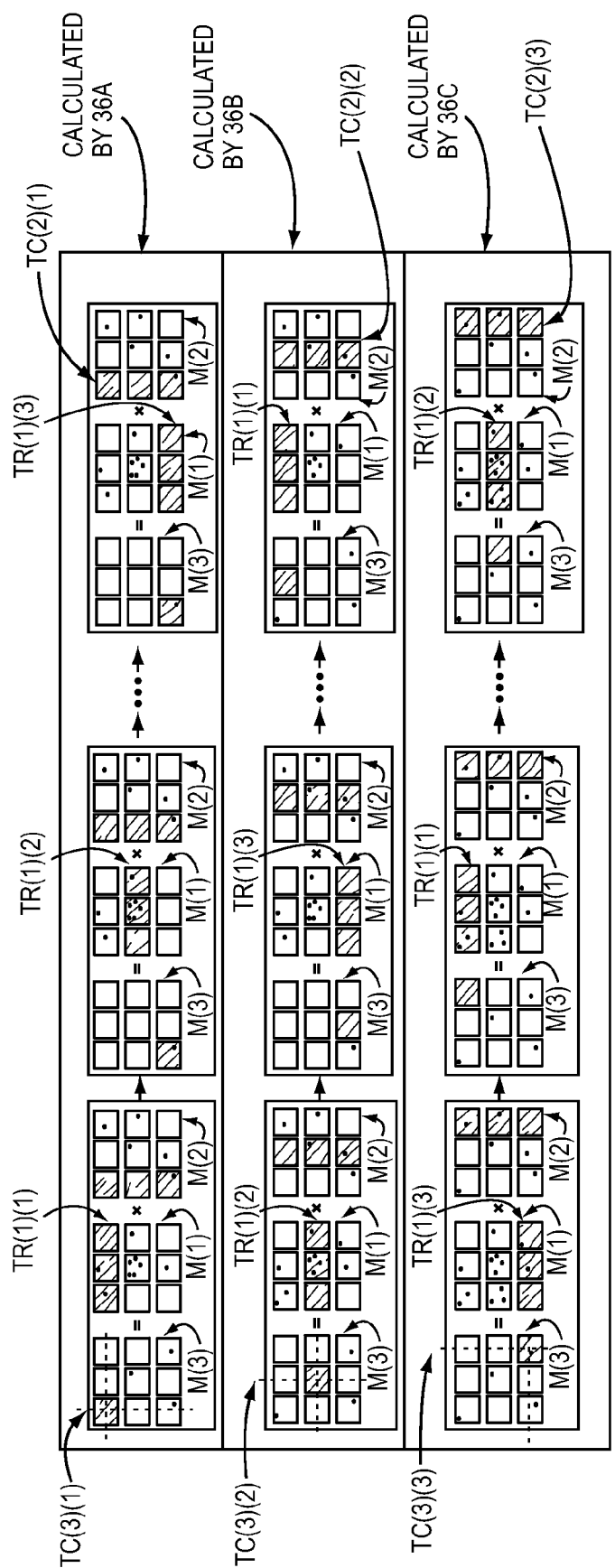

Referring now to FIGS. 2, 6, and 7C, FIG. 7C illustrates one embodiment of submatrix multiplication operations that may be performed by the LiM blocks 36 to multiply the sparse matrix $M(1)$ and the sparse matrix $M(2)$ in order to generate the sparse matrix $M(3)$. The calculations performed by the LiM block 36A are illustrated in FIG. 7C. More specifically, the LiM block 36A includes the functional logic units 42A(1), 42A(2), and 42A(3).

In this embodiment, the functional logic unit 42A(1) is configured to load the submatrix tiles from the submatrix tile rows TR(1) into the first local memory section 40A for each of the submatrix multiplication operations. The functional logic unit 42A(2) is configured to load the submatrix tiles from the submatrix column TC(2)(1) of the sparse matrix $M(2)$. Thus, the LiM block 36A always operates on the submatrix tiles in the same submatrix column TC(2)(1) of the sparse matrix $M(2)$. The functional logic unit 42A(3) is then configured to access the submatrix tiles loaded into the first local memory section 40A. The functional logic unit 42A(3) then performs the sparse matrix multiplication algorithm on the submatrix tiles to generate the resultant submatrix tile. The resultant submatrix tile is then accumulated as one of the submatrix tiles for the sparse matrix $M(3)$. The functional logic unit 42A(3) is configured to store the submatrix tile of the sparse matrix $M(3)$ in the first local memory section 40A as part of the computational result. Once the sparse matrix-matrix multiplication algorithm has been performed on all the submatrix tiles in a submatrix tile row of the sparse matrix $M(1)$ and the submatrix tiles in the submatrix tile column TC(2)(1) of the sparse matrix $M(2)$ so that all of the resultant matrix has been accumulated, the functional logic unit 42A(3) is configured to load the submatrix tile of the sparse matrix $M(3)$ into the primary memory 30 from the first local memory section 40A. Appropriate mapping data may be provided in the metadata array 60.

Referring again to FIGS. 2, 6, and 7C, the calculations performed by the LiM block 36B are illustrated in FIG. 7C. More specifically, the LiM block 36B includes the functional logic units 42B(1), 42B(2), and 42B(3). In this embodiment, the functional logic unit 42B(1) is configured to load the submatrix tiles from the matrix tile subrows TR(1) into the second local memory section 40B for each of the submatrix multiplication operations. The functional logic unit 42B(2) is configured to load the submatrix tiles from the submatrix column TC(2)(2) of the sparse matrix $M(2)$. Thus, the LiM block 36B always operates on the submatrix tiles in the same submatrix column TC(2)(2) of the sparse matrix $M(2)$. The functional logic unit 42B(3) is then configured to access the submatrix tiles loaded into the second local memory section 40B. The functional logic unit 42B(3) then performs the sparse matrix multiplication algorithm on the submatrix tiles to generate the resultant submatrix tile. The resultant submatrix tile is then accumulated as one of the submatrix tiles for the sparse matrix M(3). The functional logic unit 42B(3) is configured to store the submatrix tile of the sparse matrix M(3) in the second local memory section 40B as part of the computational result. Once the computational sparse matrix multiplication algorithm has been performed on all the submatrix tiles in a submatrix tile row of the sparse matrix M(1) and the submatrix tiles in the subrow TC(2)(2) of the sparse matrix M(2) so that all of the resultant matrix has been accumulated, the functional logic unit 42B(3) is configured to load the submatrix tile of the sparse matrix M(3) into the primary memory 30 from the second local memory section 40B. Appropriate mapping data may be provided in the metadata array 60.

Referring again to FIGS. 2, 6, and 7C, the calculations performed by the LiM block 36C are illustrated in FIG. 7C. More specifically, the LiM block 36C includes the functional logic units 42C(1), 42C(2), and 42C(3). In this embodiment, the functional logic unit 42C(1) is configured to load the submatrix tiles from the submatrix tile subrows TR(1) into the third local memory section 40C for each of the submatrix multiplication operations. The functional logic unit 42C(2) is configured to load the submatrix tiles from the submatrix tile column TC(2)(3) of the sparse matrix M(2). Thus, the LiM block 36C always operates on the submatrix tiles in the same submatrix column TC(2)(3) of the sparse matrix M(2). The functional logic unit 42C(3) is then configured to access the submatrix tiles loaded into the third local memory section 40C. The functional logic unit 42C(3) then performs the sparse matrix multiplication algorithm on the submatrix tiles to generate the resultant submatrix tile. The resultant submatrix tile is then accumulated as one of the submatrix tiles for the sparse matrix M(3). The functional logic unit 42C(3) is configured to store the submatrix tile of the sparse matrix M(3) in the third local memory section 40C as part of the computational result. Once the computational sparse matrix multiplication algorithm has been performed on all the submatrix tiles in a submatrix tile subrow of the sparse matrix M(1) and the submatrix tiles in the submatrix subrow TC(2)(3) of the sparse matrix M(2) so that all of the resultant submatrices are accumulated, the functional logic unit 42C(3) is configured to load the submatrix tile of the sparse matrix M(3) into the primary memory 30 from the third local memory section 40C. Appropriate mapping data may be provided in the metadata array 60.

Consequently, as shown in FIG. 7C, the computational LiM layer 24 of FIG. 6 is configured such that each LiM block 36 computes for each different submatrix tile of the sparse matrix M(3) independently, by accessing the appropriate submatrix tiles of the sparse matrix M(1) and sparse matrix M(2).

Figure 8:
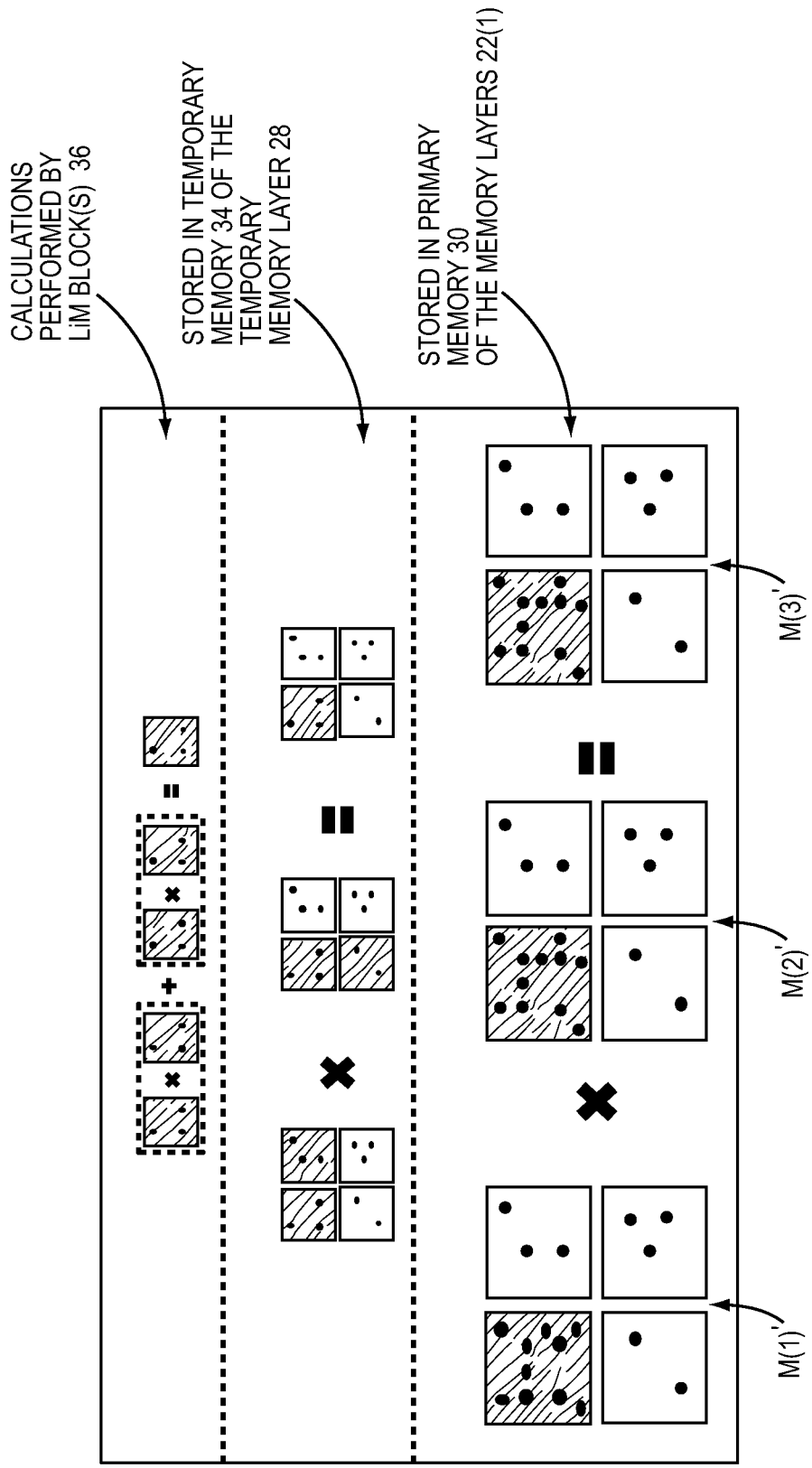
FIG. 8 is an exemplary visual illustration that demonstrates exemplary procedures that may be performed by the 3DIC memory chip shown in FIG. 2 to provide sparse matrix-matrix multiplication when the temporary memory layer is activated.

FIG. 8 is an exemplary visual illustration that demonstrates exemplary procedures that may be performed by the 3DIC memory chip 10(1) shown in FIG. 2 to provide sparse matrix-matrix multiplication when the temporary memory layer 28 is activated. FIG. 8 shows a hierarchical SpGEMM algorithm being performed. More specifically, a sparse matrix M(1)' and a sparse matrix M(2)' are stored in the primary memory 30 and are multiplied to generate a sparse matrix M(3)' in a manner similar to the process described above with regard to FIGS. 7A-7C. To do this, however, the functional logic units 42 are first configured to load a sparse sub-block of the sparse matrix M(1)' and a sparse sub-block of the sparse matrix M(2)' in the temporary memory layer 28. In the hierarchical SpGEMM, the temporary memory layer 28 is configured to further subdivide each of the sub-blocks of the sparse matrix M(1)' and the sparse matrix M(2)' into smaller submatrix tiles. The calculations performed by the LiM blocks 36 are computations of the submatrix tiles in the temporary memory 34 of the temporary memory layer 28. Since the temporary memory layer 28 is configured to decompose the sub-blocks into smaller submatrix tiles, the computation of the resulting sub-blocks will reuse sub-blocks in the temporary memory 34 so that the sub-blocks do not have to be accessed from the primary memory 30 again. Accordingly, utilizing the temporary memory 34 in the temporary memory layer 28 can save energy by reducing the number of times that the primary memory 30 is accessed. Note that the sub-blocks include the submatrix tiles and that the sub-blocks may be considered larger submatrix tiles.

A different type of specialized computational processing that may be performed by the 3DIC memory chip 10(1) shown in FIG. 2 is a radar-to-optical image conversion shown in FIGS. 9A-9C. More specifically, the FIGS. 9A-9C are exemplary visual illustrations that demonstrate exemplary procedures that may be performed by the 3DIC memory chip 10(1) shown in FIG. 2 when the computational LiM layer 24 is configured to convert a radar image tile into an optical image tile. In this embodiment, the memory layers 22(1) are configured to store the data 32 having a radar image. The radar image is stored as a plurality of radar image tiles within the primary memory 30.

Referring now to FIGS. 2 and 9A, FIG. 9A illustrates the procedures that the functional logic units 42 are configured to perform for each radar image tile RT of the radar image stored within the primary memory 30. In particular, the functional logic units 42 are configured to load the radar image tile RT through the TSVs 26(1) into the local memory 40. The functional logic units 42 then access the radar image tile RT loaded into the local memory 40. As shown in FIG. 9A, the functional logic units 42 are configured to functionally process the radar image tile RT from the local memory 40. The functional logic units 42 are also configured to perform a radar image formation algorithm on the radar image tile RT to generate a spatial radar image tile ST that is included in the computational result. The radar image tile RT is a radar reflectivity image tile with radar reflectivity image values in the Fourier domain, while the spatial radar image tile ST has spatial radar image values in the spatial domain. The functional logic units 42 store the computational result, which includes the spatial radar image tile ST, in the local memory 40. The spatial radar image tile ST may then be stored in the primary memory 30 as part of a spatial radar image.

By iterating through the entirety of the radar reflectivity image tiles (e.g., radar image tile RT) of the radar image, the spatial radar image is generated by the computational LiM layer 24. Each radar image tile RT includes radar reflectivity image values p(x,y) mapped to a polar grid PG. (Note that for the sake of simplicity and clarity, not all of the radar reflectivity image values p(x,y) are labeled in FIG. 9A.) In this embodiment, the functional logic units 42 are configured to perform the radar image formation algorithm in block RTP within FIG. 9A. In particular, in the block RTP, the functional logic units 42 are configured to calculate interpolated image values (sub-block SBI), perform a perspective transformation on the polar grid (sub-block SBP), and perform an inverse Fourier transform operation on the interpolated image values (sub-block SBIFFT) in order to generate the spatial radar image tile ST having spatial radar image values O(x,y). (Note that for the sake of simplicity and clarity, not all of the spatial radar image values O(x,y) in the spatial radar image tile ST are labeled in FIG. 9A.)

Referring now to FIGS. 2 and 9B, FIG. 9B illustrates one embodiment of the procedures related to the interpolation of the radar reflectivity image values p(x,y) of the sub-block SBI and the perspective transformation on the polar grid PG shown in the sub-block SBP. As shown in the sub-block SBI in FIG. 9B, the functional logic units 42 may initially superimpose a rectangular grid RG onto the polar grid PG of the radar reflectivity image tile RT. The functional logic units 42 are then configured to calculate interpolated image values P(x,y) such that each of the interpolated image values P(x,y) is based on neighboring radar reflectivity image values p(x,y). (Note that for the sake of clarity and simplicity, not all of the interpolated image values P(x,y) are pointed to in FIG. 9B.) As shown by the sub-block SBP, the functional logic units 42 are configured to perform a perspective transformation on the polar grid PG and the rectangular grid RG such that the polar grid is transformed into a second rectangular grid RG2. In other words, in the sub-block SBP, the functional logic units 42 perform the same perspective transformation that transforms the polar grid PG into the second rectangular grid RG2. Thus, the rectangular grid RG is transformed into a distorted quadrilateral grid DQG. With this conversion, a standard 2D interpolation method (e.g., bilinear interpolation or bicubic interpolation) can be applied afterwards to calculate the interpolated image values P(x,y) from their neighborhood radar image reflectivity values p(x,y). In this embodiment, the interpolated image values P(x,y) are mapped to distorted quadrilateral grid DQG by being associated with the neighboring locations of the radar reflectivity image values p(x,y) on the second rectangular grid RG2. After the coordinate transformation, the radar reflectivity image values p(x,y) that were on the polar grid PG lie on the second rectangular grid RG2, while tentative locations of the interpolated image values P(x,y) lie in the distorted quadrilateral grid DQG. Thus, in the rectangular grid RG (i.e., the original coordinate system for the interpolated image value P(x,y) at sub-block SBI) and the distorted quadrilateral grid DQG (i.e., the transformed coordinate system for the interpolated image value P(x,y) at sub-block SBP), the interpolated image values P(x,y) preserve the same distances from their neighborhood radar reflectivity image values p(x,y) in both the x direction and the y direction.

In block BN, an interpolated image value P(i,j) and neighboring polar image values p(i,j), p(i,j+1), p(i+1,j), and p(i+1,j+1) are shown after the perspective transformation. The polar image values p(i,j), p(i,j+1), p(i+1,j), and p(i+1,j+1) are mapped to locations in the rectangular grid RG2, while the interpolated image value P(i,j) (calculated based on the polar image values p(i,j), p(i,j+1), p(i+1,j), and p(i+1,j+1)) is mapped to the distorted quadrilateral grid DQG are shown by the block BN. Since the interpolated image value P(i,j) is associated with the polar image values p(i,j), p(i,j+1), p(i+1,j), and p(i+1,j+1), the interpolated image value P(i,j) is mapped to the second rectangular grid RG2. Furthermore, a distance dx in the x direction and a distance dy in the y direction from the neighboring polar image values p(i,j), p(i,j+1), p(i+1,j), and p(i+1,j+1) are preserved in the distorted quadrilateral grid DQG when compared to the location of the interpolated image value P(i,j) and the locations on the polar grid PG for the polar image values p(i,j), p(i,j+1), p(i+1,j), and p(i+1,j+1).

In this embodiment, 2D surface interpolations are used to calculate the interpolated image value P(i,j) from the neighboring polar image values p(i,j), p(i,j+1), p(i+1,j), and p(i+1,j+1). More specifically, a bilinear 2D surface interpolation is used. However, it should be noted that in other embodiments, any type of surface interpolation may be used, such as bicubic interpolation.

Referring again to FIGS. 2 and 9A, in the subblock SBIFFT, the functional logic units 42 are configured to perform an inverse Fourier transform operation on the interpolated image values P(x,y) mapped to the distorted quadrilateral grid DQG so as to generate the spatial radar image tile ST having the spatial radar image values O(x,y). In this embodiment, a 2D inverse fast Fourier transform IFFT is performed so that the spatial radar image values O(x,y) replace the interpolated image values P(i,j) in the distorted quadrilateral grid DQG. Thus, the spatial radar image tile ST has the spatial radar image values O(x,y) in the distorted quadrilateral grid DQG. More specifically, the spatial radar image values O(x,y) are mapped to the locations in the distorted quadrilateral grid DQG since the spatial radar image values O(x,y) replace the interpolated image values P(x,y).

Referring now to FIGS. 6 and 9C, FIG. 9C illustrates one embodiment of 2D IFFT operations that may be performed on the interpolated image values P(x,y) of interpolated image tiles IN after the procedures described in FIG. 9B are performed on various radar reflectivity image tiles RT. Each of the LiM blocks 36A, 36B, 36C is configured to perform an IFFT operation. More specifically, a 2D IFFT operation is performed as a 1D IFFT operation in the x direction (which is indicated as stage 1 in FIG. 9C) and a 1D IFFT operation in the y direction (which is indicated as stage 2 in FIG. 9C). The memory controller 38 may be configured to coordinate the various 1D IFFT operations through the information stored in the metadata array 60. The memory controller 38 may be dedicated to communication among the metadata array 60, the LiM blocks 36A, 36B, 36C, and the primary memory 30 in the memory layers 22(1). More specifically, the metadata array 60 stores the information which maps the interpolated image tiles IN to the primary memory 30. The LiM blocks 36A, 36B, 36C operate in parallel to perform the stage 1 and stage 2 1D IFFT operations in the x direction and the y direction and are therefore customized to perform 2D IFFT operations.

Referring now to FIGS. 1 and 10, FIG. 10 illustrates exemplary procedures that may be performed to construct the 3DIC memory chip 10 shown in FIG. 1. The 3DIC memory chip 10 may be constructed with a semiconductor fabrication device capable of forming 3DIC chips. Furthermore, a physical layout of the 3DIC memory chip 10 may be provided as input into the semiconductor fabrication system in order for the semiconductor fabrication system to construct the 3DIC memory chip 10. In one embodiment, the semiconductor fabrication device forms at least one of the memory layers 22(1) that comprises the primary memory 30 configured to store the data 32 (block 68). For example, the semiconductor fabrication device may form each of the memory layers 22 that includes the primary memory 30 configured to store the data 32. The semiconductor fabrication device may then form the plurality of VIAs 26 interconnected with the primary memory 30 (block 70). Thus, the plurality of VIAs 26 may be configured to interconnect the memory layer 22A with the memory layer 22B and the memory layer 22B with the memory layer 22C. The VIAs 26 may also be constructed in order to provide further connections. The semiconductor fabrication system may then form the computational LiM layer 24 comprising at least one LiM block 36 (shown in FIG. 2) such that the at least one LiM block 36 comprises the local memory 40 (shown in FIG. 2) interconnected with the functional logic units 42 (shown in FIG. 2) to process the data 32 (shown in FIG. 2) from the primary memory 30 that is accessed through the VIAs 26 (block 72). The functional logic units 42 (shown in FIG. 2) will be configured to perform algorithms depending on what types of computations are needed. For example, the functional logic units 42 may be constructed to perform the operations described in FIGS. 7A-7C, FIG. 8, FIGS. 9A-9C, and FIGS. 10A and 10B described above.

Those skilled in the art will recognize improvements and modifications to the preferred embodiments of the present disclosure. All such improvements and modifications are considered within the scope of the concepts disclosed herein and the claims that follow.

What is claimed is:

1. A three-dimensional (3D) integrated circuit (3DIC) memory chip, comprising:
   at least one memory layer comprising a primary memory configured to store data;
   a plurality of vertical interconnect access structures (VIAs) interconnected with the primary memory; and
   a computational logic-in-memory (LiM) layer comprising at least one LiM block, the at least one LiM block comprising:
      local memory interconnected with functional logic units to process the data from the primary memory that is accessed through the VIAs;
      wherein the functional logic units are configured to:
         load one or more data subsets of the data from the primary memory over the VIAs into the local memory;
         access the one or more data subsets loaded into the local memory;
         computationally process the one or more data subsets accessed from the local memory to generate a computational result; and
         store the computational result.

2. The 3DIC memory chip of claim 1, wherein:
   the primary memory is comprised of dynamic random access memory (DRAM); and
   the local memory is comprised of static random access memory (SRAM).

3. The 3DIC of claim 1 further comprising a memory controller operable in a DRAM memory-only mode and a computational mode, wherein the memory controller is configured to:
   allow a central processing unit (CPU) to access the DRAM in the at least one memory layer in the same manner that the CPU accesses a strict memory chip having other DRAM while the memory controller is in the DRAM memory-only mode; and
   return the computational result to the CPU when the CPU accesses the DRAM in the at least one memory layer while the memory controller is in the computational mode.

4. The 3DIC memory chip of claim 1, wherein the plurality of VIAs is comprised of a plurality of through-silica vias (TSVs).

5. The 3DIC memory chip of claim 1, wherein:
   the 3DIC memory chip is integrated into a memory package; and
   the computational LiM layer and the at least one memory layer are stacked within the memory package.

6. The 3DIC memory chip of claim 1, wherein the functional logic units are embedded into the local memory.

7. The 3DIC memory chip of claim 1 wherein:
   the primary memory is comprised of dynamic random access memory (DRAM);
   the plurality of VIAs is comprised of a plurality of through-silica vias (TSVs); and
   the plurality of TSVs is sized for DRAM streaming.

8. The 3DIC of claim 1, further comprising at least one temporary memory layer comprising a temporary memory interconnected with the VIAs, the temporary memory configured to store the one or more data subsets from the primary memory and wherein the functional logic units are configured to load the one or more data subsets into the local memory by being configured to:
   load the one or more data subsets of the data from the primary memory into the temporary memory through the VIAs; and
   load the one or more data subsets of the data from the temporary memory into the local memory through the VIAs.

9. The 3DIC of claim 8, wherein the temporary memory is comprised of a scratchpad memory.

10. The 3DIC of claim 1, further comprising a memory interface, wherein the memory interface is configured such that the 3DIC appears externally as a non-computational memory chip to one or more central processing units (CPUs).

11. The 3DIC of claim 10, wherein the memory interface complies with standard dual in-line memory module (DIMM) memory interface form factors for dynamic random access memory (DRAM).

12. The 3DIC of claim 1, wherein the at least one memory layer is configured to store a first matrix included in the data within the primary memory such that the first matrix is stored as a plurality of submatrix tiles that are provided within the first matrix.

13. The 3DIC of claim 12, wherein the at least one memory layer is configured to store the plurality of submatrix tiles that is provided within the first matrix as two-dimensional (2D) hypersparse tiles.

14. The 3DIC memory chip of claim 13 wherein the at least one memory layer is further configured to store each of the plurality of submatrix tiles in a compressed sparse matrix format.

15. The 3DIC memory chip of claim 1, wherein:
   the at least one memory layer is configured to store the data that includes a first matrix and a second matrix within the primary memory; and
   the functional logic units are configured to:
      load one or more data subsets of the data from the primary memory over the VIAs into the local memory such that the one or more data subsets include a first submatrix tile of the first matrix and a second submatrix tile of the second matrix;
      access the one or more data subsets including the first submatrix tile and the second submatrix tile loaded into the local memory; and
      computationally process the one or more data subsets accessed from the local memory by being configured to:
         perform a sparse matrix-matrix multiplication algorithm that multiplies the first submatrix tile and the second submatrix tile so as to generate a resulting submatrix tile; and
         accumulate the resulting submatrix tile within a third submatrix tile, wherein the computational result comprises the third submatrix tile.

16. The 3DIC memory chip of claim 15, wherein the functional logic units are configured to perform the sparse matrix-matrix multiplication algorithm as a generalized sparse matrix-matrix multiplication (SpGEMM) algorithm.

17. The 3DIC memory chip of claim 1, further comprising the at least one memory layer comprising a temporary memory interconnected with the VIAs, wherein:
   the at least one memory layer is configured to store the data that includes a first matrix and a second matrix within the primary memory;

the temporary memory is configured to:
store a first sub-block of the first matrix from the primary memory, wherein the first sub-block comprises first submatrix tiles mapped in a two-dimensional (2D) arrangement; and
store a second sub-block of the second matrix from the primary memory, wherein the second sub-block comprises second submatrix tiles mapped in a 2D arrangement; and the computational LiM layer is configured to schedule submatrix multiplication operations that cause the functional logic units to multiply the first sub-block and the second sub-block, wherein, for each of the submatrix multiplication operations, the functional logic units are configured to:
load the one or more data subsets from the primary memory into the local memory such that the one or more data subsets comprise one or more of the first submatrix tiles and one or more of the second submatrix tiles;
access the one or more data subsets that include the one or more of the first submatrix tiles and the one or more of the second submatrix tiles from the local memory;
computationally process the one or more data subsets accessed from the local memory by being configured to perform a sparse matrix-matrix multiplication algorithm on the one or more of the first submatrix tiles and the one or more of the second submatrix tiles to generate one or more resultant matrix tiles;
accumulate each of the one or more resultant matrix tiles in a third matrix tile of one or more third matrix tiles such that the computational result includes the one or more third matrix tiles as part of a third matrix; and
store the computational result in the local memory.

18. The 3DIC memory chip of claim 17, wherein:
the at least one LiM block is comprised of a first LiM block and a second LiM block;
the first LiM block includes a first set of the functional logic units and a first local memory section of the local memory, wherein for each of the submatrix multiplication operations corresponding to the first set of the functional logic units, the first set of the functional logic units is configured to:
load a first one of the first submatrix tiles and a first one of the second submatrix tiles from the temporary memory into the first local memory section;
access the first one of the first submatrix tiles and the first one of the second submatrix tiles loaded into the first local memory section;
perform the sparse matrix-matrix multiplication algorithm on the first one of the first submatrix tiles and the first one of the second submatrix tiles to generate one of the one or more resultant matrix tiles;
accumulate the one of the one or more resultant matrix tiles in one of the one or more third matrix tiles such that the computational result includes the one of the one or more third matrix tiles; and
store the one of the one or more third matrix tiles in the first local memory section as part of the computational result; and
the second LiM block includes a second set of the functional logic units and a second local memory section of the local memory, wherein for each of the submatrix multiplication operations corresponding to the second set of the functional logic units, the second set of the functional logic units is configured to:
load a second one of the first submatrix tiles and a second one of the second submatrix tiles from the temporary memory into the second local memory section;
access the second one of the first submatrix tiles and the second one of the second submatrix tiles loaded into the second local memory section;
perform the sparse matrix-matrix multiplication algorithm on the second one of the first submatrix tiles and the second one of the second submatrix tiles to generate an other one of the one or more resultant matrix tiles;
accumulate the other one of the one or more resultant matrix tiles in an other one of the one or more third matrix tiles; and
store the other one of the one or more third matrix tiles in the second local memory section as part of the computational result.

19. The 3DIC memory chip of claim 18, wherein the computational LiM layer is further configured such that the first one of the first submatrix tiles is always in a different subrow of the first subblock than the second one of the first submatrix tiles, and the first one of the second submatrix tiles is always in a different subcolumn of the second subblock than the second one of the second submatrix tiles.

20. The 3DIC memory chip of claim 17, wherein:
the first matrix is a first sparse matrix; and
the second matrix is a second sparse matrix.

21. The 3DIC memory chip of claim 1, wherein:
the at least one memory layer is configured to store the data having a radar image having a plurality of radar reflectivity image tiles within the primary memory; and
for each radar reflectivity image tile of the plurality of radar reflectivity image tiles the functional logic units are configured to:
load one or more data subsets of the data from the primary memory over the VIAs into the local memory such that the one or more data subsets include a radar reflectivity image tile of the plurality of radar reflectivity image tiles;
access the one or more data subsets including the radar reflectivity image tile of the plurality of radar reflectivity image tiles loaded into the local memory;
computationally process the one or more data subsets accessed from the local memory by being configured to perform a radar image formation algorithm on the radar reflectivity image tile to generate a spatial radar image tile that is included in the computational result; and
store the computational result that includes the spatial radar image tile in the local memory as part of a spatial radar image.

22. The 3DIC memory chip of claim 21, wherein, for each of the radar reflectivity image tiles, the radar reflectivity image tile includes radar reflectivity image values mapped to a polar grid, wherein the functional logic units are configured to perform the radar image formation algorithm on the radar reflectivity image tile to generate the spatial radar image tile by being configured to:
superimpose a rectangular grid onto the polar grid of the radar reflectivity image tile;
perform a perspective transformation on the polar grid and the rectangular grid such that the polar grid is transformed into a second rectangular grid and the rectangular grid is transformed into a distorted quadrilateral grid, wherein interpolated image values are mapped to the distorted quadrilateral grid;

calculate the interpolated image values such that each interpolated image value of the interpolated image values is interpolated based on neighboring ones of the radar reflectivity image values; and perform an inverse Fourier transform operation on the interpolated image values mapped to the distorted quadrilateral grid so as to generate the spatial radar image tile.

23. The 3DIC memory chip of claim 1, wherein the functional unit blocks are configured to store the computational result in the local memory.

24. The 3DIC memory chip of claim 1, wherein the functional unit blocks are configured to store the computational result directly in the primary memory.

25. The 3DIC memory chip of claim 1, wherein the functional unit blocks are further configured to transmit the computational result directly to a central processing unit (CPU).

26. A data processing method, comprising:
    storing data in primary memory provided by at least one memory layer;
    loading one or more data subsets of the data from the primary memory into a computational logic-in-memory (LiM) layer over a plurality of vertical interconnect access structures (VIAs);
    processing the one or more data subsets of the data computationally within the computational LiM layer; and
    storing a computational result.

27. The data processing method of claim 26, wherein loading the one or more data subsets of the data from the primary memory into the computational LiM layer comprises loading the one or more data subsets within local memory provided by the computational LiM layer, wherein the plurality of VIAs interconnects the primary memory and the local memory.

28. The data processing method of claim 27, wherein processing the one or more data subsets of the data computationally within the computational LiM layer comprises processing the one or more data subsets of the data loaded into the local memory with one or more functional logic units within the computational LiM layer.

29. The data processing method of claim 26, wherein:
    storing data in the primary memory provided by the at least one memory layer comprises storing a first matrix and a second matrix within the primary memory;
    loading the one or more data subsets of the data from the primary memory into the computational LiM layer over the plurality of VIAs comprises loading a first submatrix tile of the first matrix and a second submatrix tile of the second matrix into the computational LiM layer over the plurality of VIAs; and processing the one or more data subsets of the data computationally within the computational LiM layer comprises performing a sparse matrix-matrix multiplication algorithm that multiplies the first submatrix tile and the second submatrix tile so as to generate a resulting submatrix tile.

30. The data processing method of claim 26, wherein:
    storing data in the primary memory provided by the at least one memory layer comprises storing a radar image having a plurality of radar reflectivity image tiles within the primary memory;
    loading the one or more data subsets of the data from the primary memory into the computational LiM layer over the plurality of VIAs comprises loading one or more of the plurality of radar reflectivity image tiles from the primary memory into the computational LiM layer over the plurality of VIAs; and
    processing the one or more data subsets of the data computationally within the computational LiM layer comprises performing a radar image formation algorithm on the one or more radar reflectivity image tiles to generate one or more spatial radar image tiles, wherein the computational result comprises the one or more spatial radar image tiles.

31. A method of constructing a three-dimensional (3D) integrated circuit (3DIC) memory chip, comprising:
    forming at least one memory layer comprising a primary memory configured to store data;
    forming a plurality of vertical interconnect access structures (VIAs) interconnected with the primary memory; and
    forming a computational logic-in-memory (LiM) layer comprising at least one LiM block such that the at least one LiM block comprises:
        local memory interconnected with functional logic units to process the data from the primary memory that is accessed through the VIAs;
        wherein the functional logic units are configured to:
            load one or more data subsets of the data from the primary memory over the VIAs into the local memory;
            access the one or more data subsets loaded into the local memory;
            computationally process the one or more data subsets accessed from the local memory to generate a computational result; and
            store the computational result in the local memory.

\* \* \* \* \*